(12) United States Patent
Forrest

(10) Patent No.: US 11,799,413 B2
(45) Date of Patent: Oct. 24, 2023

(54) FLOATING SOLAR SYSTEM

(71) Applicant: Flotaics, LLC., Sebastopol, CA (US)

(72) Inventor: Kenneth Roy Forrest, Sebastopol, CA (US)

(73) Assignee: Flotaics, LLC, Sebastopol, CA (US)

( * ) Notice: Subject to any disclaimer, the term of this patent is extended or adjusted under 35 U.S.C. 154(b) by 407 days.

(21) Appl. No.: 16/947,889

(22) Filed: Aug. 21, 2020

(65) Prior Publication Data
US 2021/0058022 A1    Feb. 25, 2021

Related U.S. Application Data

(60) Provisional application No. 63/039,972, filed on Jun. 16, 2020, provisional application No. 62/705,069, filed on Jun. 9, 2020, provisional application No. 63/006,616, filed on Apr. 7, 2020, provisional application No. 62/890,389, filed on Aug. 22, 2019.

(51) Int. Cl.
| | |
|---|---|
| *H02S 10/40* | (2014.01) |
| *H02S 20/32* | (2014.01) |
| *B63B 35/44* | (2006.01) |
| *H02S 30/00* | (2014.01) |

(52) U.S. Cl.
CPC ............. *H02S 10/40* (2014.12); *B63B 35/44* (2013.01); *H02S 20/32* (2014.12); *H02S 30/00* (2013.01); *B63B 2035/4453* (2013.01)

(58) Field of Classification Search
CPC .......... H02S 10/40; H02S 20/32; H02S 30/00; H02S 20/00; H02S 40/22; B63B 35/44; B63B 2035/4453; Y02E 10/47; Y02E 10/52; F24S 25/636; F24S 25/65;
(Continued)

(56) References Cited

U.S. PATENT DOCUMENTS

| | | |
|---|---|---|
| 2011/0094549 A1 | 4/2011 | Lin |
| 2011/0232727 A1 | 9/2011 | Cangini et al. |
| | (Continued) | |

FOREIGN PATENT DOCUMENTS

| | | |
|---|---|---|
| CN | 203504483 U | 3/2014 |
| CN | 106335612 A | 1/2017 |
| | (Continued) | |

OTHER PUBLICATIONS

International Search Report and Written Opinion, PCT App. No. PCT/US2020/070446, dated Nov. 10, 2020, 12 pages.
(Continued)

*Primary Examiner* — Michael Y Sun
(74) *Attorney, Agent, or Firm* — Nicholson De Vos Webster & Elliott LLP; Judith Szepesi

(57) ABSTRACT

A floating solar system comprising a grid comprising a plurality of rod-cables, at least some of the rod-cables comprising fiber reinforced polymer, the grid providing a support structure for the floating solar system. The floating solar system further including a plurality of solar floats to provide buoyancy, each solar float coupled to the grid, the plurality of solar floats not providing structural support. The floating solar system designed to support a plurality of solar panels, each solar panel coupled to a corresponding solar float, the solar panel providing shade for the corresponding solar float.

22 Claims, 22 Drawing Sheets
(21 of 22 Drawing Sheet(s) Filed in Color)

(58) Field of Classification Search
CPC .. F24S 30/422; F24S 2025/6003; F24S 20/70; F24S 25/37; F24S 25/50
See application file for complete search history.

(56) References Cited

U.S. PATENT DOCUMENTS

| | | | |
|---|---|---|---|
| 2012/0132262 A1 | 5/2012 | Sagayama | |
| 2012/0187222 A1 | 7/2012 | Galili | |
| 2012/0279557 A1 | 11/2012 | Alwitt et al. | |
| 2013/0152839 A1 | 6/2013 | Graf | |
| 2015/0326171 A1 | 11/2015 | Patton et al. | |
| 2016/0006391 A1 | 1/2016 | Kokotov et al. | |
| 2016/0025074 A1 | 1/2016 | Sato et al. | |
| 2016/0368577 A1 | 12/2016 | Gaveau | |
| 2017/0117425 A1* | 4/2017 | Asbeck | H01L 31/0475 |
| 2018/0119994 A1* | 5/2018 | Helming | F24S 20/70 |
| 2019/0032963 A1 | 1/2019 | Lin | |
| 2019/0178274 A1 | 6/2019 | Katz | |

FOREIGN PATENT DOCUMENTS

| | | | |
|---|---|---|---|
| KR | 1020090072528 * | 10/2009 | |
| KR | 10-2013-0117306 A | 10/2013 | |
| WO | 2013/034970 A1 | 3/2013 | |
| WO | WO-2013037944 A1 * | 3/2013 | E04C 5/165 |
| WO | WO-2016064022 A1 * | 4/2016 | H02S 20/00 |
| WO | 2018/081655 A1 | 5/2018 | |

OTHER PUBLICATIONS

National Renewable Energy Lab, 99.9% of Commercial FPV Market is Plastic Design, National Renewable Energy Lab/ Flicker, 1 page.
Performed Line Products, "Big-Grip Dead-end", EN-CA-1014-3, 2019, 4 pages.
Solaris Energy, "Product", available online at <http://www.solaris-synergy.com/Advantages.html>, retrieved on Nov. 25, 2020, 1 page.
Ciel & Terre International, "Hydrelio(registered) Technology Catalog: Floating PV Solutions", Available Online at <https://issuu.com/cieletterre/docs/c_t_catalog_hydrelio_technology__20>, Mar. 5, 2018 , 14 pages.
Ciel & Terre International, "Simple, Durable and Affordable Floating Solar PV Platforms", Available Online at <https://www.ciel-et-terre.net/hydrelio-floating-solar-technology/hydrelio-benefits/>, 2021, 7 pages.
DNV.GL, "Design, Development and Operation of Floating Solar Photovoltaic Systems", Recommended Practice, DNVGL-RP-0584, Mar. 2021, 152 pages.
International Bank for Reconstruction and Development / The World Bank, "Where Sun Meets Water: Floating Solar Market Report", Solar Energy Research Institute of Singapore, 2019, 131 pages.
Isifloating, "Pioneers in Floating Solar Systems Since 2008", Isifloating by Isigenere, Available Online at <https://www.isifloating.com/en/solar-flotante-isifloating-by-isigenere-english/>, 2019, 2 pages.
MG Solar, "Floating Solar Structure System", Available Online at <mgsolarracking.com/news/mg-solar-floating-solar-structure-system>, Sep. 1, 2020, 5 pages.
Solaris Synergy, "A leader in the provision and operation of Floating PV Solar systems", Solaris Synergy (Israel) Ltd., Available Online at <https://sinovoltaics.com/wp-content/uploads/2015/08/Solaris-Synergy-EOPD-June-2015-.pdf>, Jun. 2015, 2 pages.
Sungrow, "Floating PV System", Available Online at <https://en.sungrowpower.com/SolutionsDetail/1088>, 2021, 5 pages.
Tripsolar, "Tripsolar Floating Solar Mounting Bracket", Available Online at <https://www.tripsolar.com/floating-solar-mounting-bracket.html>, 2021, 11 pages.

* cited by examiner

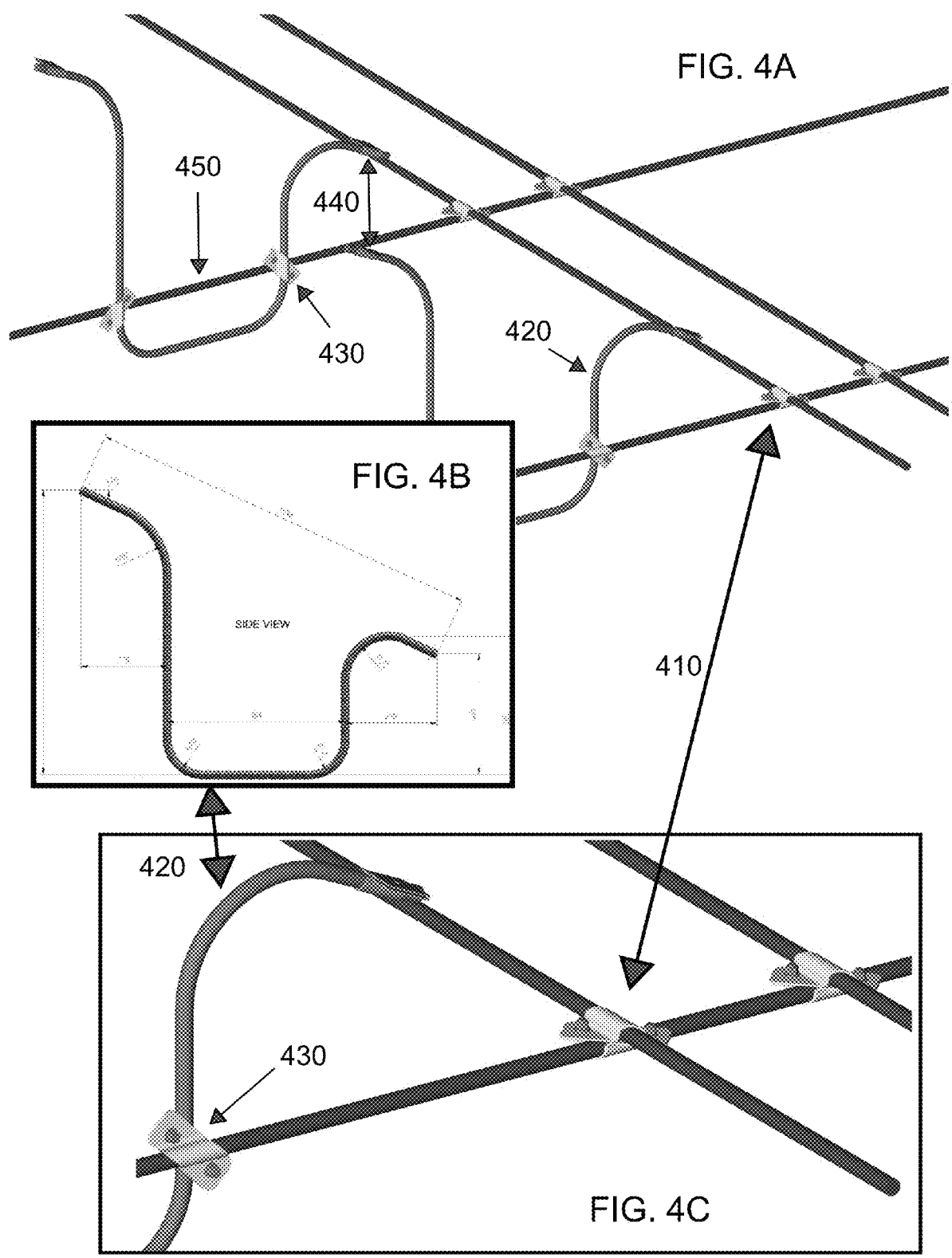

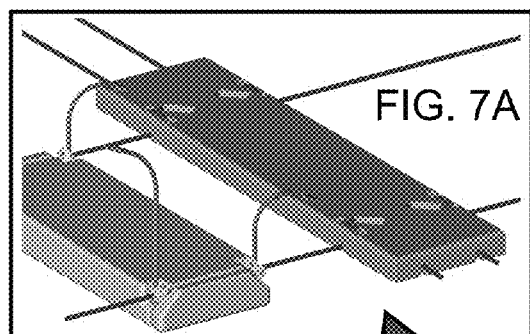
FIG. 7A
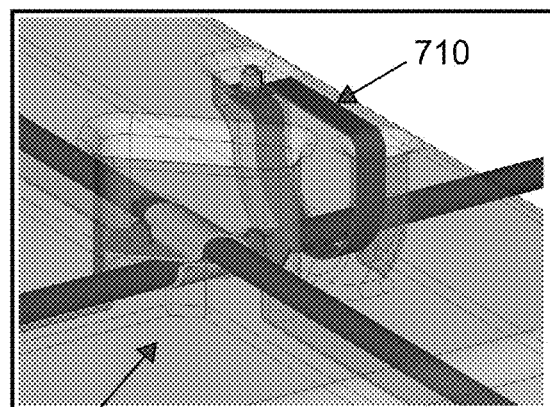
FIG. 7B
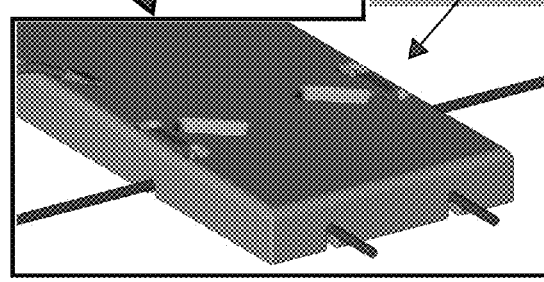
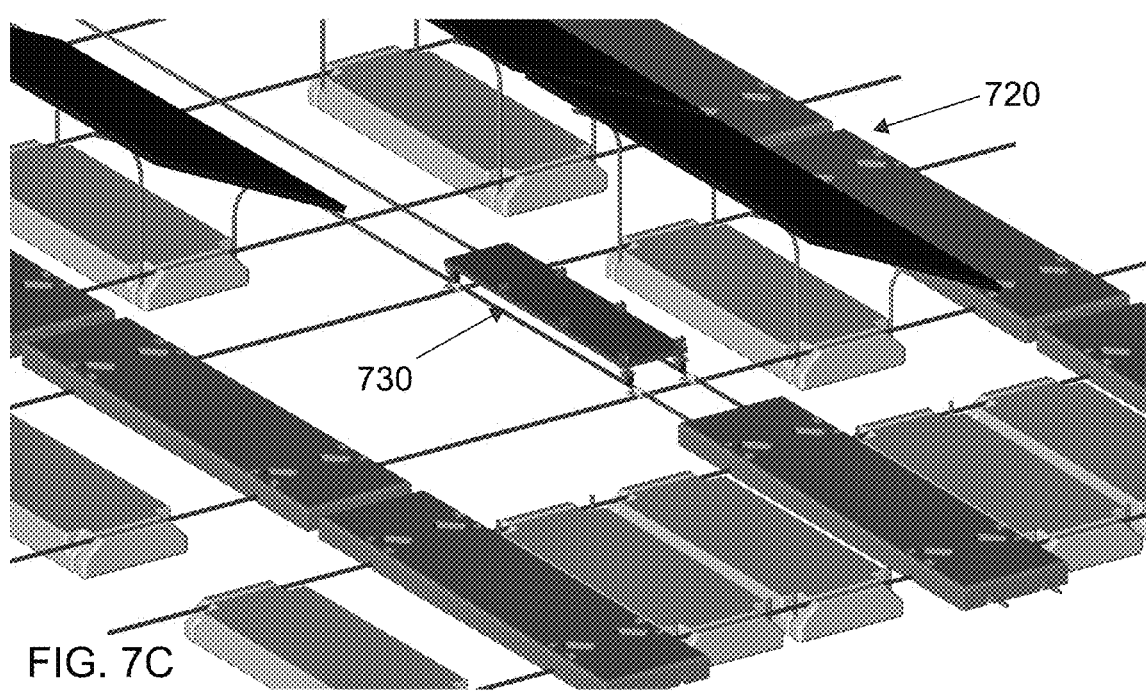
FIG. 7C

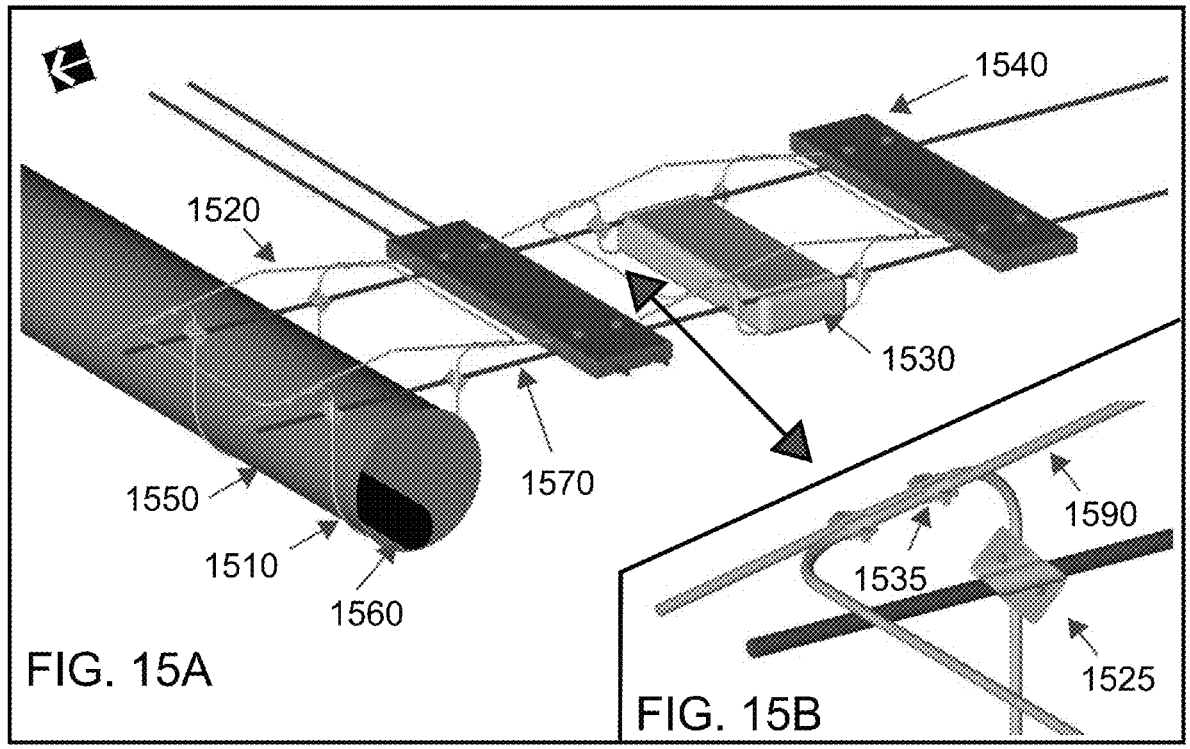
FIG. 15A
FIG. 15B
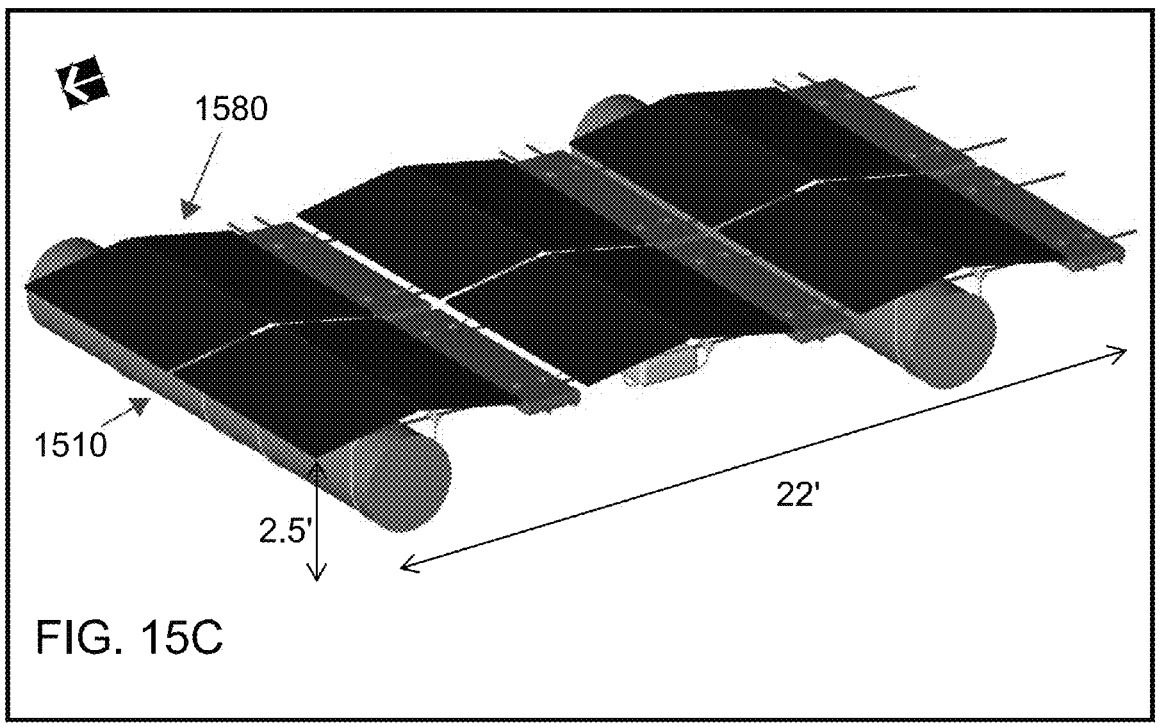
FIG. 15C

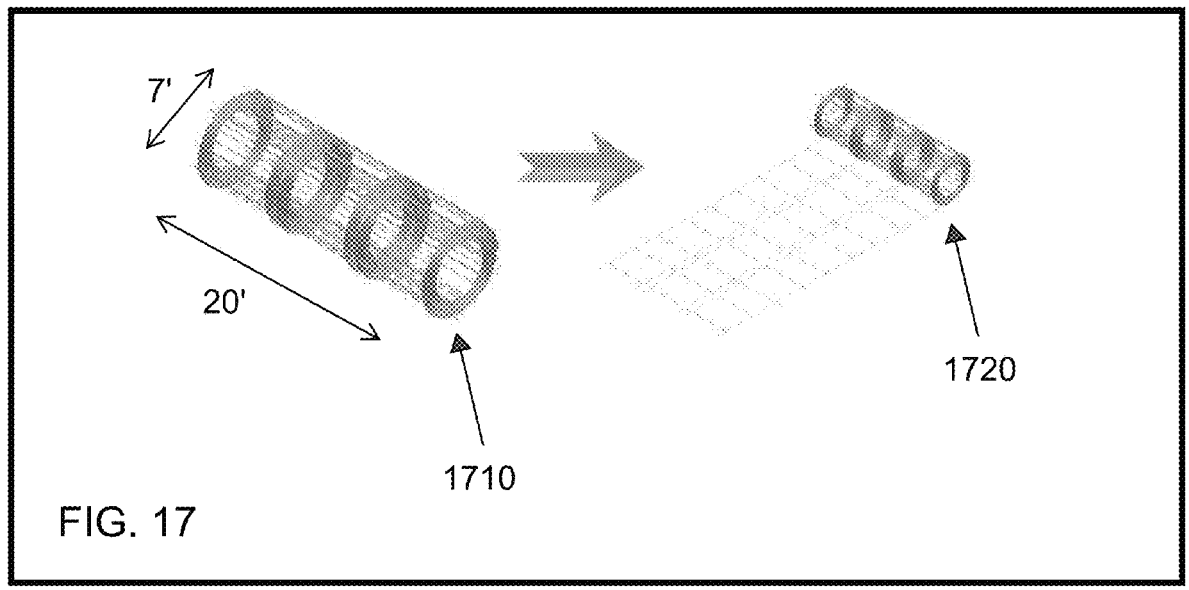
FIG. 17
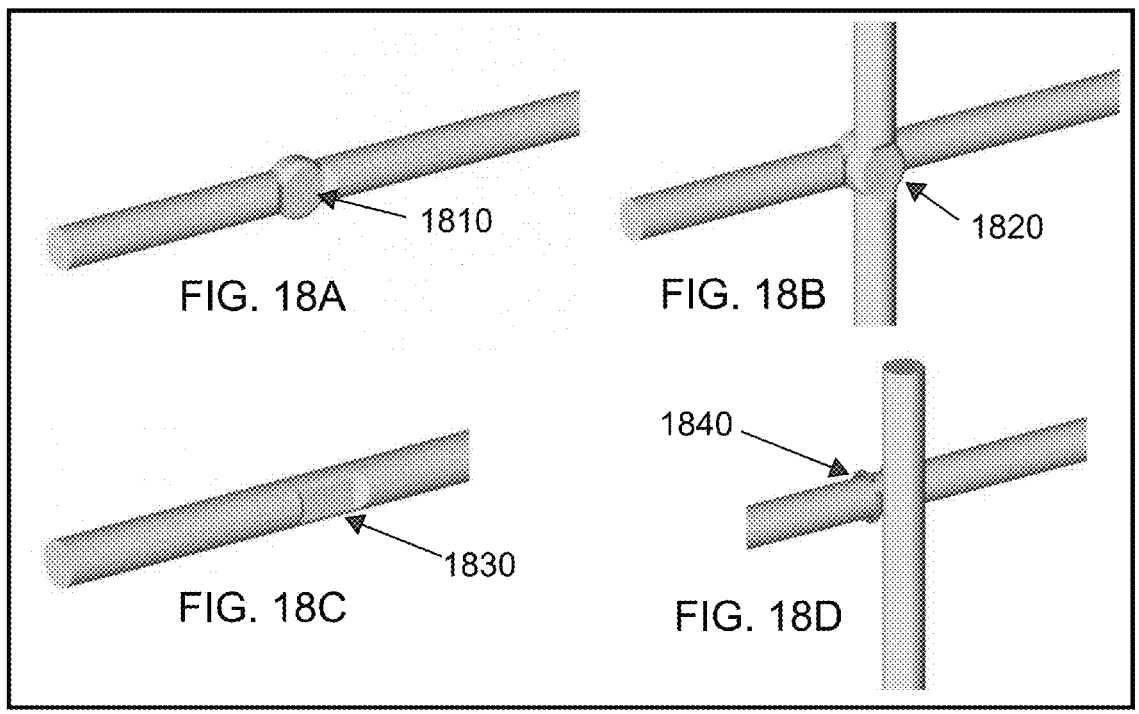
FIG. 18A
FIG. 18B
FIG. 18C
FIG. 18D

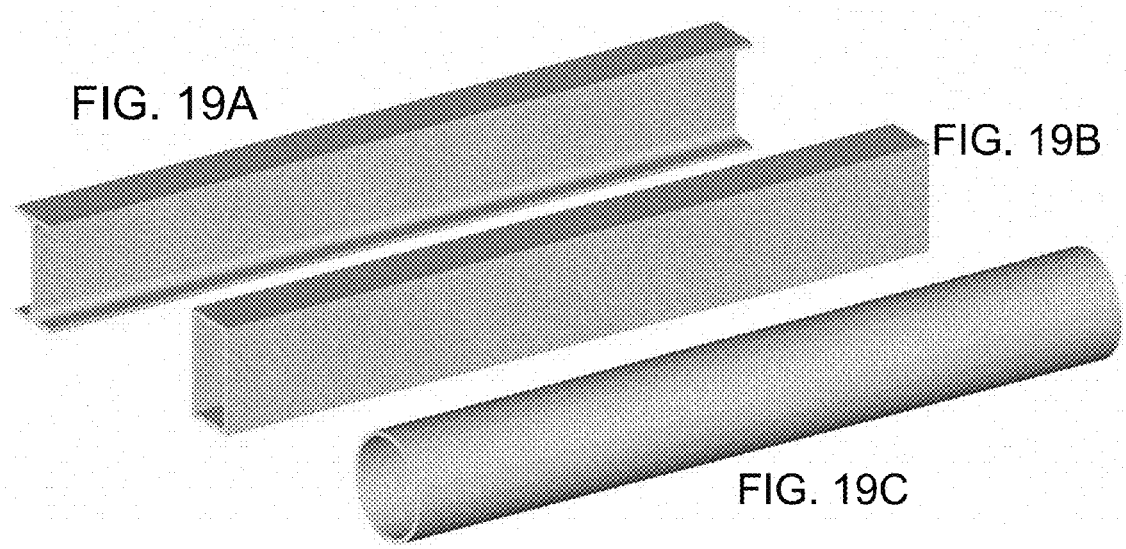
FIG. 19A
FIG. 19B
FIG. 19C
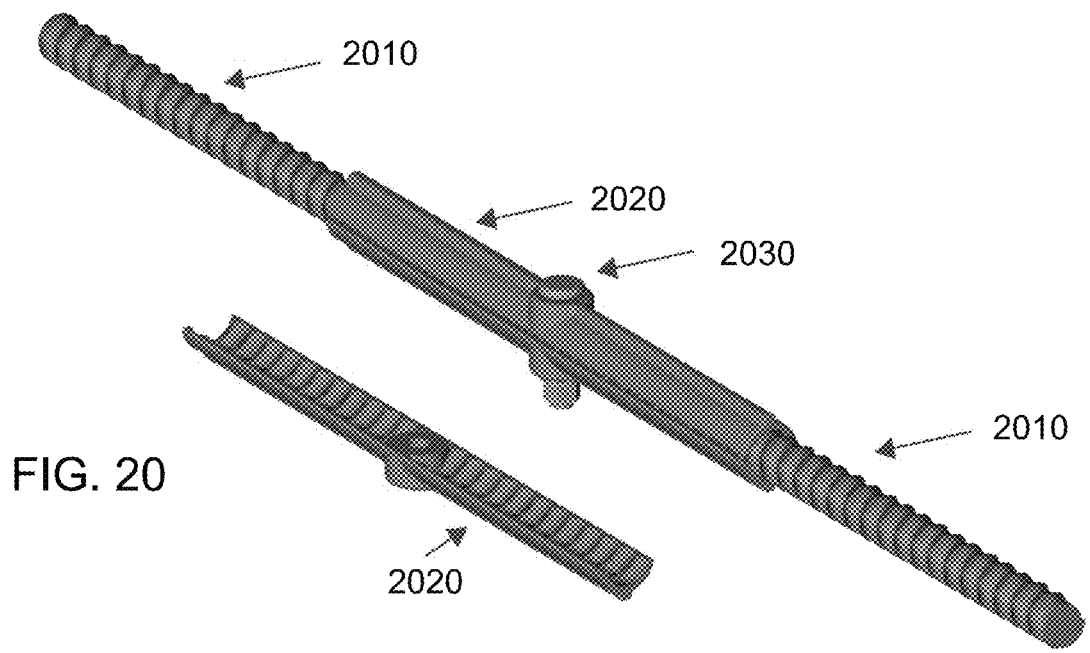
FIG. 20

FLOATING SOLAR SYSTEM

RELATED APPLICATIONS

The present application claims priority to U.S. Provisional Applications 62/705,069 filed on Jun. 9, 1920, 62/890,389 filed on Aug. 22, 2019, 63/006,616 filed on Apr. 7, 2020, 63/039,972 filed on Jun. 16, 1920, each of which is incorporated by reference in its entirety.

FIELD

The present invention relates to solar power, and more particularly a Floating Solar Mounting or Racking System installed on water.

BACKGROUND

Solar panels are becoming a major global source for electrical generation, with the vast majority of installed solar production built on land or buildings. However, when land is either not available for use or its cost is too high for solar development, solar panels installed on water—or floating solar—is becoming a more common occurrence. Additionally, when solar panels get hot, their efficiency is reduced.

One method of addressing these issues is by placing solar panels on water. Man-made reservoirs, for example, may now serve as a dual-use resource. Present technologies of floating solar use plastic for both flotation and structural purposes. While plastic is an excellent material for flotation, when used for structural purposes, it is not as efficient, as other materials with regard to cost, strength and durability. Solar power plants also are generally subject to soiling (dust accumulation) which degrades the performance without regular panel washing. Many water bodies can be leased for solar power production at a lower cost of than the adjacent land.

Floating solar systems are typically anchored to the shore or bottom of the body of water. The load forces of these anchoring systems along with the solar array framework or racking system, must also carry these accumulated wind loading forces. However, there is a loading limit to the array size or array section, after which it must be anchored.

BRIEF DESCRIPTION OF THE FIGURES

The patent or application file contains at least one drawing executed in color. Copies of this patent or patent application publication with color drawing(s) will be provided by the Office upon request and payment of the necessary fee.

The present invention is illustrated by way of example, and not by way of limitation, in the figures of the accompanying drawings and in which like reference numerals refer to similar elements and in which:

FIGS. 4A-4C illustrate embodiments of frames mounted to an solar array grid system.

FIGS. 7A-7B illustrate embodiments of walkway floats attached to a solar array grid.

FIG. 7C illustrates one embodiment of the grid including solar floats and walkway floats, and a custom maintenance vehicle traveling along the solar array grid.

FIGS. 15A-15C illustrate another embodiment a FPV array using a different support structure for the solar panels.

FIG. 17 illustrates one embodiment or a rolled grid system.

FIG. 18A-18D illustrate embodiments of FRP rods.

FIG. 19A-19C illustrate embodiments of FRP structural members.

FIG. 20 illustrates one embodiment of an FRP coupling.

DETAILED DESCRIPTION

Figure 1A:
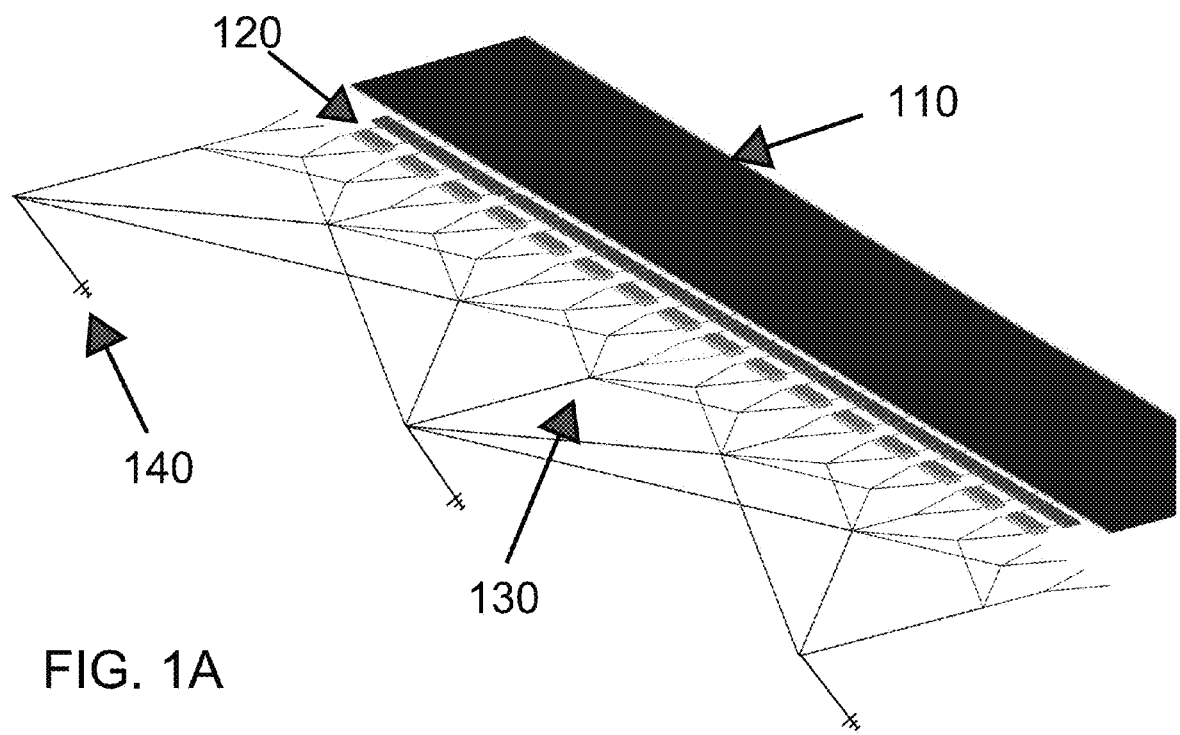
FIGS. 1A and 1B illustrate a perspective and a top view of one embodiment of a portion of a floating solar array.

The present system consists of a lattice network of fiber reinforced polymer (FRP) rods, steel cables, or a combination of steel cables and FRP, that interconnect into a grid. This structural grid supports solar floats and solar panels which interconnect into a floating solar array. The support elements for the solar panels and solar floats may also be made of FRP, steel, and/or aluminum. The grid also attaches to an anchoring system. This solar array is typically installed on a large body of water and then anchored in place.

A floating solar racking system in one embodiment utilizes fiber reinforced polymer (FRP) as structural support in a floating solar system. In one embodiment, the floating solar system uses FRP as the primary support structure for such floating solar installations. The present application uses floating photovoltaic (FPV) array, solar array, and floating solar system interchangeably. The term "racking" as used in this application refers to the grid which support solar floats and walkway floats.

Fiber-reinforced polymer or Fiber-reinforced plastic (FRP) composite materials are made of a polymer matrix reinforced with fibers. The fibers are usually glass (in fiberglass), carbon (in carbon fiber reinforced polymer), aramid, or basalt. The polymers are usually an epoxy, vinyl ester, or polyester thermo-setting plastic, or phenol formaldehyde resin.

Using such materials within the floating solar array, reduces the frequency of anchoring. Furthermore, constructing a stronger solar racking system allows for deployment in a higher wind regime and thus a steeper module tilt angle, which increases electrical production and results in higher product reliability.

The resulting floating solar mounting or racking systems are in general more affordable, structurally stronger, more durable to last longer, "greener" to reduce global plastic production, and more efficient at producing electrical power. Utilizing fiber reinforced polymer for floating solar structural racking systems is a technical advancement, and provides a number of benefits.

A well-designed grid structure used in FPV development is a technical advancement for the floating solar industry. A floating solar grid framework resists significantly increased wind and wave loading, allowing for increased product durability, higher energy yields, lower costs, fewer anchoring attachments and a lower carbon manufacturing footprint. In one embodiment, the system may use repurposed plastics, however in one embodiment re-purposed plastics are not relied upon for structural integrity.

FRP rebar is readily available as a high-volume produced material used primarily in the concrete industry. FRP rebar is roughly four times as strong as steel rebar per similar size and half the weight of steel. While FRP is marginally more expensive than steel rebar, when FRP is formed to replace tube steel, as in a solar panel supporting application, it is very competitive with steel. Pultruded FRP glass rebar or rod is by far the most efficiently manufactured and highest volume of produced FRP, primarily used for highway bridges and buildings. Glass rebar or GFRP—in one embodiment the preferred type of FRP used for the FRP framework—has an estimated use in the 2024 US market of $1.25 billion, primarily in traditional civil construction. FRP rebar's market availability and economic viability makes it an attractive material for floating solar projects.

In one embodiment, present solar array system consists of an array or lattice network of rod-cables, which are made of fiber reinforced polymer (FRP) rods, FRP rebar, or steel cable that interconnect into a grid. This structural grid supports solar floats which provide support for solar panels which interconnect into a floating solar array. The FRP grid also attaches to an anchoring system. This solar array is typically installed on a body of water and then anchored in place.

Basic Design

Figure 1B:
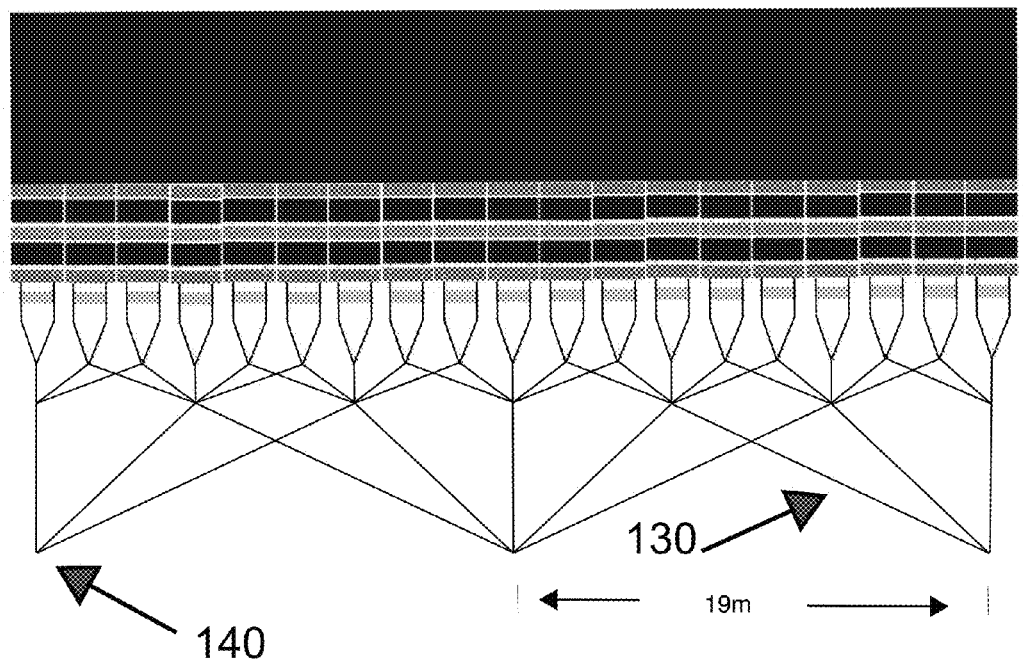

FIGS. 1A and 1B illustrate one embodiment of a floating solar array. The solar panels and racking structure made of solar floats and an FRP grid are illustrated as a single unit 110 for simplicity. In one embodiment, mooring or anchoring floats surround the solar array 120 and are connected to the mooring cables 130 which are then used to attach the solar array for stability. In one embodiment, the mooring cables 130 are attached to ground anchors along the shoreline 140. In one embodiment, mooring cables 130 are arranged so a pair of mooring cables extending from an anchoring float 120 have a connector. In one embodiment, the connector is an anchoring thimble. That connector in one embodiment is coupled in two directions, to other cables. Those cables, in turn, are coupled in two directions to subsequent cables. In one embodiment, a set of cables between 3 and 10 are coupled together. In this way, a highly stable attachment may be made with a limited number of anchors. The anchors may be attached in various ways, as is known in the art.

The arrangement of the solar array may be square or rectangular, or another shape, based on the configuration of the pond or other water area on which it is designed to be placed. Electrical conduit raceways are affixed to the walkway floats to carry the electricity generated from the Floats to shore, as is known in the art.

Figure 1C:
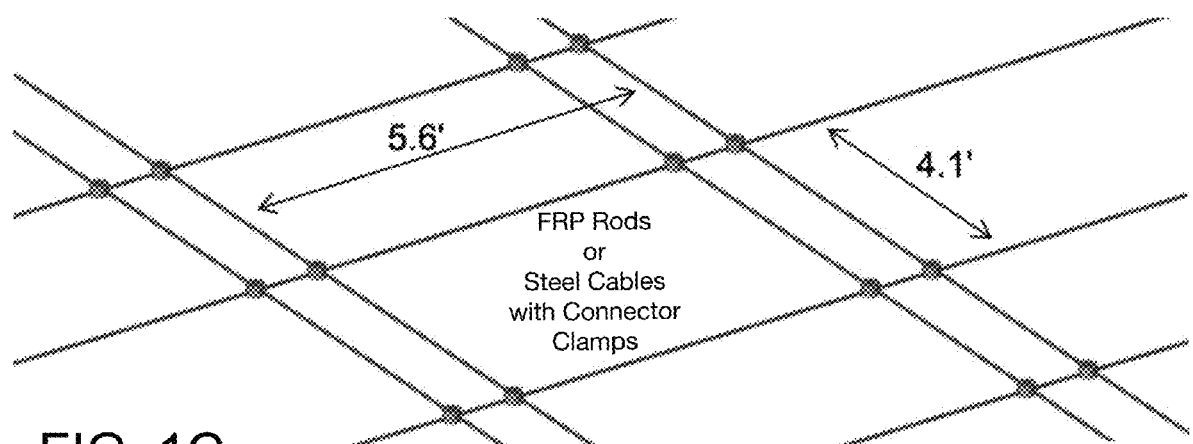
FIGS. 1C and 1D illustrate perspective views of two embodiments of a grid portion of a floating solar array.

FIG. 1C illustrates one embodiment of a grid system of FRP rods, FRP rebar, and/or steel cables with connector clamps. Collectively the materials making up the grid system may be referred to as rod-cables. In one embodiment the FRP rods or steel cables are laid in flat plane and connected together with disk clamps, or other clamps. The FRP rods or steel cables and clamps form a grid that can extend as a two-dimensional plane and may cover many acres of water on a reservoir or other body of water. This two-dimensional grid forms the armature or racking structure for mounting floating solar components to. In one embodiment, every rod or cable is axially connected to a subsequent rebar rod until the rebar end terminates. Generally, FRP or steel cable provides flexibility to address wave motion, however for larger installations such connections may have hinged elements in between to provide strain relief from water wave loading. The termination connection is then anchored axially in tension. In one embodiment, the spacing of the rods or cables is based on the dimensions of the solar floats and solar panels. In one embodiment, as shown the has evenly spaced cables in one direction, and paired cables in the other direction. As will be shown below, in one embodiment, the solar floats and walkway floats are positioned at intersections of the rod-cables. In one embodiment, spacing between the rod-cables may range from 1 foot to 10 feet.

Figure 1D:
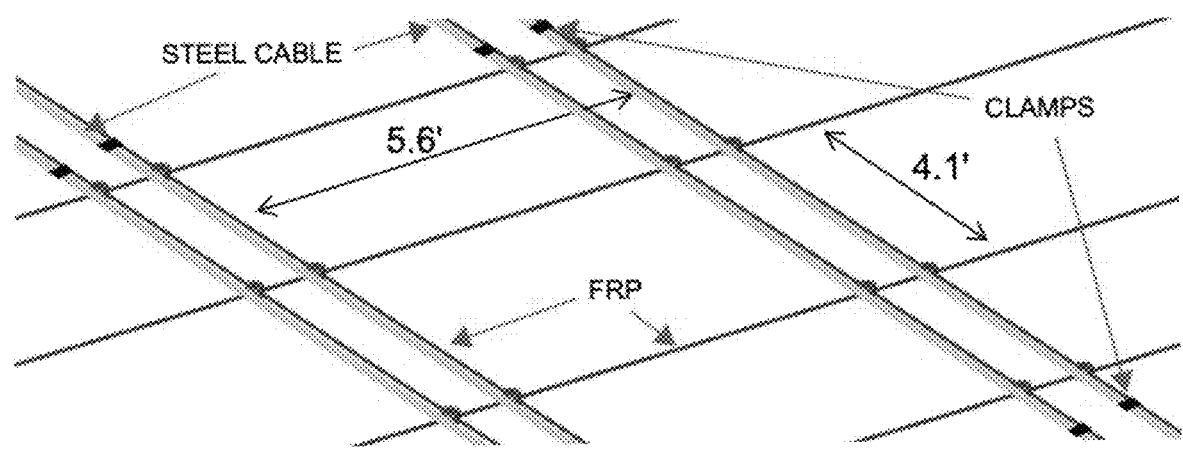

FIG. 1D illustrates one embodiment of a reinforced grid, utilizing a combination of FRP rebar and steel rods. In one embodiment ¾" steel cable and ½" FRP rods make up the mixed structure. The stronger steel cable is clamped to the FRP rod portion of the grid at greater length intervals than FRP-to-FRP clamps. The stronger steel cable provides strain relief for weaker FRP sections. Although as illustrated the reinforcing is shown in only one direction, one of skill in the art would understand that the reinforcing steel cable may be used in both directions, or may alternate such that alternating FRP bars are reinforced, or some portion of the grid is reinforced in a different structure.

In general, the grid, the support frames, and the other elements described in the present application may be made of FRP, steel, or a combination. Clamps and other attachment mechanisms may be made of FRP, steel, or plastic. Although the term "FRP rod" is used, it should be understood that unless specifically indicated otherwise, such elements may be replaced by steel or similar products. The present application does not rely on the particular material, but on the use of a structural support grid to provide a stronger and longer lasting framework for a floating solar array. In the below discussion the term "rod-cable," "rod", "cable," and "rebar" may be used interchangeably for the elements of the grid. One of skill in the art would understand that the grid may be made with FRP rods, steel cables, FRP rebar, or a combination of rods, cables, and rebar. Unless specified otherwise, any element indicated as FRP may be substituted with steel.

Figure 2A:
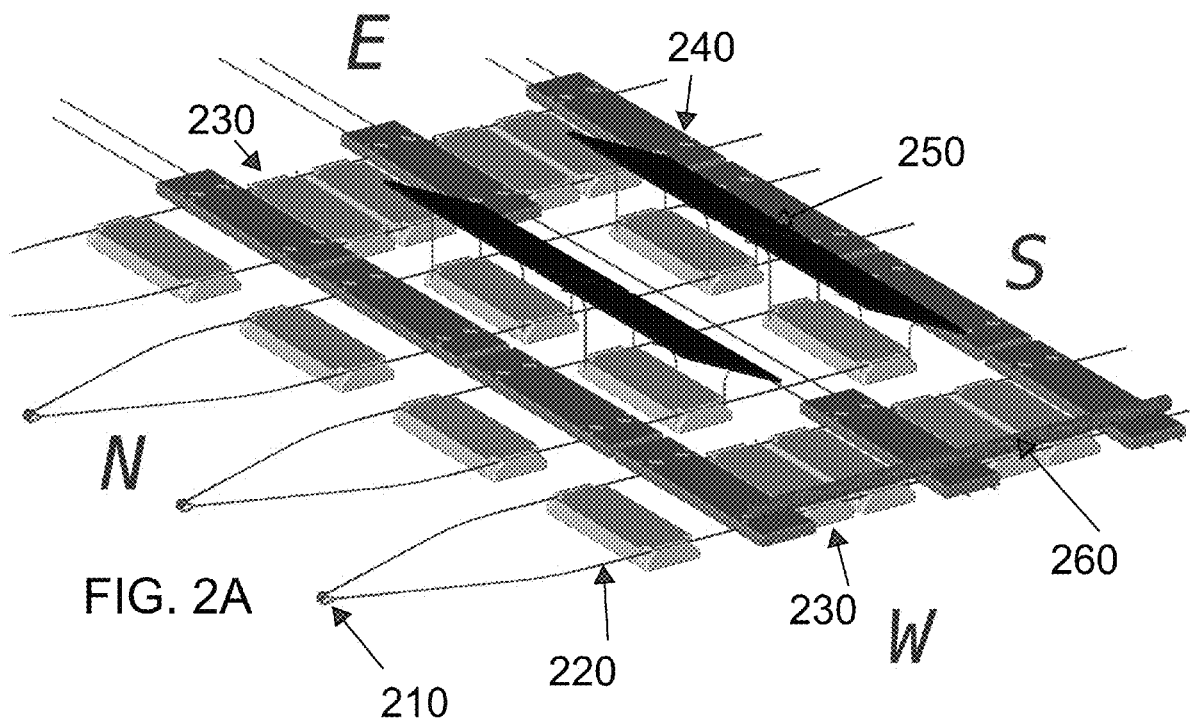
FIGS. 2A and 2B illustrate a perspective view and a side view of one embodiment of a portion of floating solar array.

FIG. 2A illustrates a trimetric perspective of one embodiment of a small floating photovoltaic (FPV) or floating solar system array. The array consists of the following components: An anchoring thimble at the end of an anchoring attachment point 210, an array primarily made of fiber-reinforced polymer rebar or rods (FRP) 220, solar floats 230 attached to the rods, walkway floats 240, solar panels 250 affixed to the solar floats 230 via frames, and an electrical conduit raceway that runs adjacent to the walkway floats of the array 260. Although not shown, each solar panel is coupled to the electrical conduit raceway to transfer the electricity generated by the solar panel.

Figure 2B:
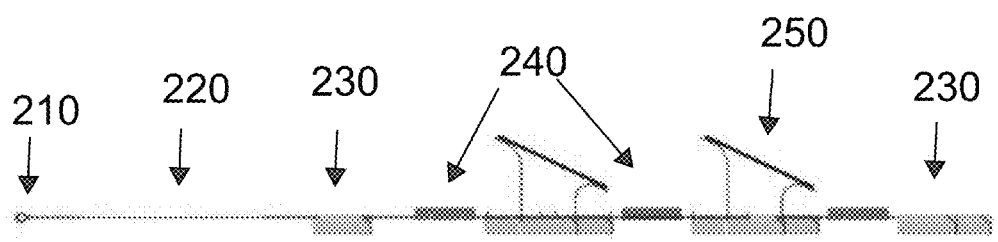

FIG. 2B illustrates a side view of the same embodiment of the FPV array. In this embodiment, the angle of the solar panels are fixed. In one embodiment, the walkway floats 240 are removably attached to the array. Although this illustration shows only two solar panels, a standard floating solar array would typically include several thousand solar panels, however, the array size could range from a small system having one half-dozen solar panels to utility-scale megawatt installations, that may use over a quarter million solar panels.

In one embodiment, the Floating Solar System can accept any solar panel type or size, unlike other prior art systems. This is because the FRP grid spacing between floats can change according to the "X" crossing placements of the intersecting FRP. Prior art designs have constrained spacing between the panels because the spacing between panels are determined by the floats' dimensions, which are fixed to the blow-mold geometry. The described floating solar system is designed to be modular and to accommodate project sizes from 5 kW to 100 MW or larger.

The plastic forming of the floating portion of the Floating Solar System is blow-molded in one embodiment. The solar floats are smaller and less expensive than the prior art floats, because they don't have to be large or long enough to interconnect to adjacent floats, because unlike the prior art, the FRP rebar or rod interconnects the array together, unlike the prior art where the plastic floats make up the interconnections.

In one embodiment, the float provides flotation and is made of plastic. In one embodiment the plastic may be high-density polyethylene. In one embodiment, the plastic may be Linear Low Density Polyethylene (LLDPE). In one embodiment, the plastic may be recycled LLDPE, HDPE, or other plastics. The grids are made of FRP. Aluminum, steel, or another rigid material may be used as stiffening struts for structural compression when needed.

Additionally, in one embodiment, removing walkways from the array, removes the requirement to support the additional weight of service personnel. When access to the array is required, the service person deploys portable walkways as needed. However, the majority of the time the spacing between rows are not occupied by walkways. By deploying walkways on an "as needed" basis, a large array will use 40% less plastic than the prior art floating solar large array design. An alternative to deploying walkways as needed, is to use a wheeled vehicle that uses the FRP as "rails", allowing the vehicle to on wheels or treads across the array.

Floating solar has several advantages over ground-mounted solar, including:
  reduction of evaporation and algae growth in the water (up to 80% reduction of both)
  cooler panels, due to the cooling effect of the water, which makes them up to 5-15% more efficient
  use of surface that would have been an under-utilized or un-utilized asset
  the ability to generate energy closer to its local use (many ponds, including waste water treatment ponds, are near urban areas where land available for ground mounted solar arrays is scarce).

In one embodiment, the FRP grid supports numerous floats and solar panels. The Fiber Reinforced Polymer (FRP) grid can be made of different types of fibers: Fiberglass or Glass (GFRP) or Basalt Fiber (BFRP) or Carbon Fiber FRP among other fibers. In one embodiment, these solar panel grids can be attached together with stainless steel or galvanized metal threaded couplings that thread onto the threaded FRP rebar. FRP solar arrays can become much larger than conventional floating solar arrays before anchoring is required. This is because an FRP floating solar structure can withstand a much greater force of accumulated wind and wave loads. FRP has a significantly higher ultimate tensile strength than plastic. The accumulated lateral wind loads are transferred through the FRP and not through the plastic floats, unlike the prior art. The ultimate tensile or lateral loading forces applied to the FRP can be significantly higher than the prior art's plastic interconnecting pieces. One of the main advantages of said invention is that FRP has a significantly greater Tensile Strength to that of High Density Polyethylene (HDPE). HDPE is the structural material used within the floating solar industry (prior art). As an example, the Ultimate Tensile Strength of Basalt FRP is 4.15-4.80 GPa, whereas the Ultimate Tensile Strength of HDPE is 0.037 GPa—thus the FRP based framework is over 100 times stronger in tensile strength than HDPE.

Figure 3A:
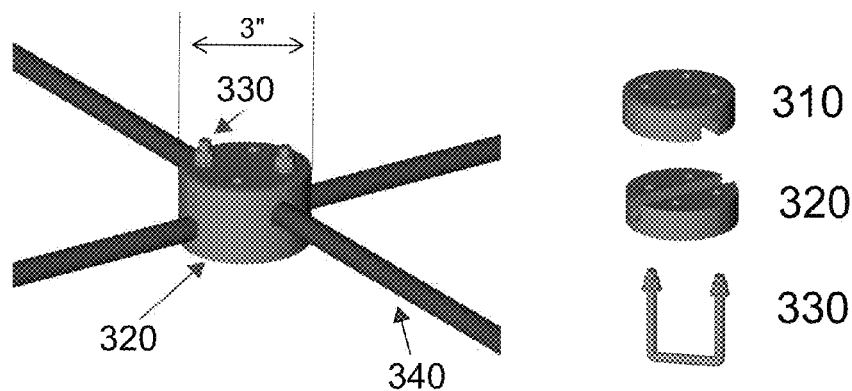
FIGS. 3A-3C illustrate embodiments of connectors to attach portions of the solar array grid system.

FIG. 3A illustrates one embodiment of a connection attachment of the elements of the array, which in one embodiment are fiber reinforced polymer (FRP) rods or rebar 340. In one embodiment, two disks 310 & 320, are coupled together 330 to clamp the crossing or intersection of two FRP rods. In one embodiment, each disk 310 & 320 is between one and five inches in diameter and between ½ and three inches thick. In one embodiment, the size of the disks 310 & 320 is defined by the diameter of the rods 340. In one embodiment, the disks are bolted together using a U-bolt 330. In one embodiment, one piece U-bolt 330 and two threaded nuts, then clamp the rods and two disks together. By using a U-bolt 330 only one wrench is required for tightening the bolts. In one embodiment, the bottom disk 320 may have a groove for the U-bolt 330.

Each disk is molded with a groove across its face which fits around an FRP rod. Thus, when the two disks are attached, the two rods are attached perpendicular to each other. In one embodiment, the rods 340 is threaded or has rings, so that the rods cannot slide within the disks.

Figure 3B:
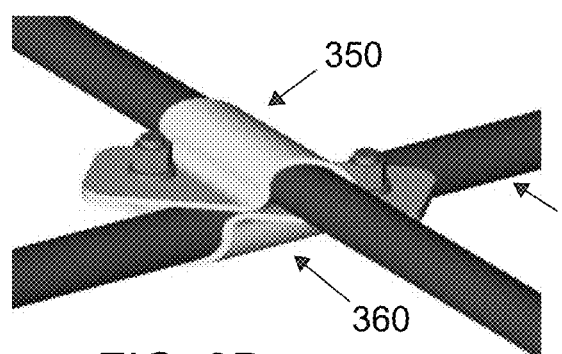
Figure 3C:
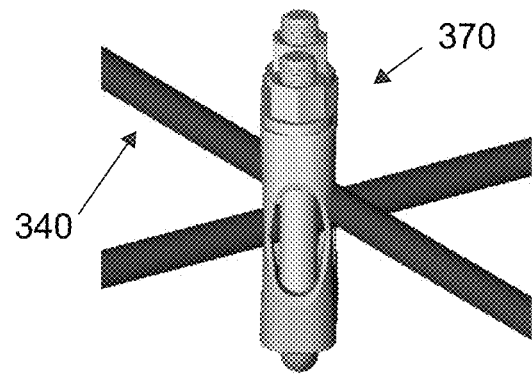

Alternative methods of attachment for the cross-connection of rebar rod are shown in FIGS. 3B-3C. The clamp in FIG. 3B is designed to fit the specific size of rebar it encases, so that when the two clamps—in one embodiment made of metal, FRP or plastic—are clamped together 350 & 360 using bolts or screws, the rebar can't slide or shift position. Such shifting could occur during high wind or wave conditions. The clamp in FIG. 3C is a double-saddle cable clamp 370. The saddled surfaces of this clamp provide a surface pressure against the FRP, and therefore, strain relief. Without the saddles, the cable clamp would provide a line pressure which could scar, pinch or damage the FRP rods.

In one embodiment, the FRP rebar or rod is threaded. In one embodiment, for the clamp of FIG. 3B, the interlocking threads where the FRP rods touch each other, may be used to further lock the rods together. In one embodiment, the clamps may have ridging corresponding to the threading of the rod, to further lock the rods together.

The accumulated wind forces of the floating solar system array are mostly transmitted as lateral tension loads through the rebar in an axial dimension and not side loading to the disks or clamps.

Figure 3D:
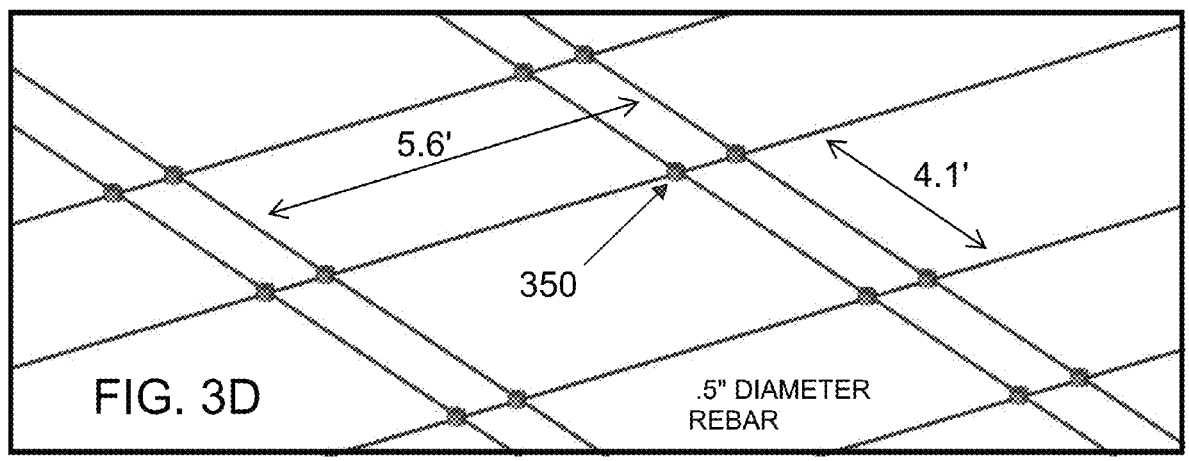
FIG. 3D illustrates a portion of a solar array grid, showing the positioning of the connectors.

FIG. 3D is an illustration of one embodiment of an array with a plurality of rods laid in flat plane and connected together with disk clamps. The disk clamps are shown in FIG. 3A. The rods and clamps form a grid that can extend as a two-dimensional plane and may cover many acres of water on a reservoir or other body of water. This two-dimensional grid forms the armature or racking structure for mounting floating solar components. Every rod is axially connected to a subsequent rod until the rod end terminates. In one embodiment, the rods are made of reinforced polymer (FRP). In another embodiment, some rods are made of FRP while others are made of a different material. Generally, FRP provides flexibility to address wave motion.

To populate larger reservoirs with larger Floating Solar System arrays, larger diameter FRP rods may be installed in conjunction with smaller diameter rods. That is, the maximum loading on the rods or grid will be less in the array's center than around the array's perimeter—due to cumulative wind loading. For example, to use different sized FRP rods more efficiently, ¾" diameter rods would occupy the perimeter of the array running around the shoreline. These rods would then connect or couple axially (end-to-end) to 9/16" rods that would occupy the array's center reservoir sections. This serves as additional structural support to counter the cumulative wind forces of larger, expansive arrays. Prefabricated FRP mat or sectional grids may be fabricated off site and then transported to the installation site on large spools. These mats on spools are then unfurled in large sectional grids and anchored in place.

In one embodiment, FRP bent rebar frames wrap around the plastic HDPE float. This elevates the panel away from the float increasing the air circulation around the solar panel which increases its electrical efficiency. The FRP frame is impervious to salt water and therefore, the floating solar system can be used in a salt water environment.

The strength of FRP grid racking allows for greater cumulative loading compared to HDPE armature racking floating systems (prior art). The Floating Solar System array can become much larger than the prior art's plastic HDPE armature racking system, when using only shore anchors. An HDPE armature racking system is more likely to require submersible anchors for any large size system array because HDPE has a weaker or lower "specific strength" or yield tensile strength than FRP and, therefore, requires more mooring support per linear foot to secure the array. If the body of water becomes too large both systems will need to revert to submersible anchors, but the HDPE armature system will revert to submersible anchors before the FRP system will. Furthermore, submersible anchoring is usually a more expensive anchoring design choice over anchoring to the shoreline.

When floats are not relied upon for providing structural support—as in the case of the prior art—then a weaker plastic can be used for flotation because the plastic's sole purpose (flotation) does not require high tensile strength, i.e., a verifiable plastic composition. It is more difficult to verify a recycled or re-purposed plastic's composition as compared to plastics made from virgin plastic resin pellets. Typically, virgin resin pellets can be specified to have the highest tensile strength properties, while recycled plastics won't make such claims. The FRP racking system, therefore, can use a higher percentage of recycled plastics for their floats as compared to the prior art.

Submersible anchors have numerous disadvantages, compared to shore anchors, including potential issues with reservoir liners, expense, water displacement, difficulty with inspection and maintenance. Additionally, anchor blocks or other submersible anchor system may become an obstacle for dredging. Anchor blocks pose an additional problem if the reservoir was to drain and the floating system became lodged on top of the anchor blocks. Because FRP racking systems are stronger than HDPE racking systems, there will be less submersible anchoring with a FRP solar system.

When the racking frame is elevated higher off the water surface to increase the reflective light captured by the bifacial panel, there will likely be an increased uplift of force acting upon the floating solar array. To combat this uplift—in one embodiment floats in either racking system: bifacial or monofacial—can be filled with water through a port in the float. This additional float weight prevents the float from undue uplift in high winds, as calculated per design environment.

In one embodiment, for larger installations such connections may have hinged elements in between to provide strain relief from water wave loading. The termination connection is then anchored axially in tension. In some embodiments, a portion of the grid and the grid connection points may utilize steel cables rather than FRP.

FIG. 4A illustrates one embodiment of two U-shaped solar panel support frames 420 affixed to the grid. In one embodiment, the frames 420 are attached to the grid with the use of strapping clamps 430. In one embodiment, the clamps are galvanized steel. These two clamps may be designed to fit two different sized rods, the U-shaped frames 420 and the rods 450. The strapping clamps are strong enough and fit tightly enough over the rebar to make the 3-dimensional framework rigid. At the end of the frame 420 are the four solar module clamps 440 that clamp the solar panel (not shown) to the U-frames 420. Tightening this type of clamp to the module also constricts the clamp to the rebar frame, because the two ends of the clamp when seated together form a clamp with a hole diameter slightly less than the diameter of the rebar. In one embodiment, the solar module clamp 440 only uses one bolt and nut to secure the frame, clamp and module. When the U-Frames and grid use the same size FRP rebar, then only one size clamp is needed and strapping clamp 430 is the same part as grid connection elements 410.

FIG. 4B illustrates one embodiment of a dimensional drawing of an exemplary U-shaped frame 420. In one embodiment, the U-shaped frame is made of FRP. However, it could also be made of steel or aluminum. Likewise, the grid 450 could be made of FRP, steel rod, steel cable, or a mix of materials.

FIG. 4C is a zoomed in view of a portion of FIG. 4A showing the strapping clamps 430 & grid connection clamps 410.

Figure 5A:
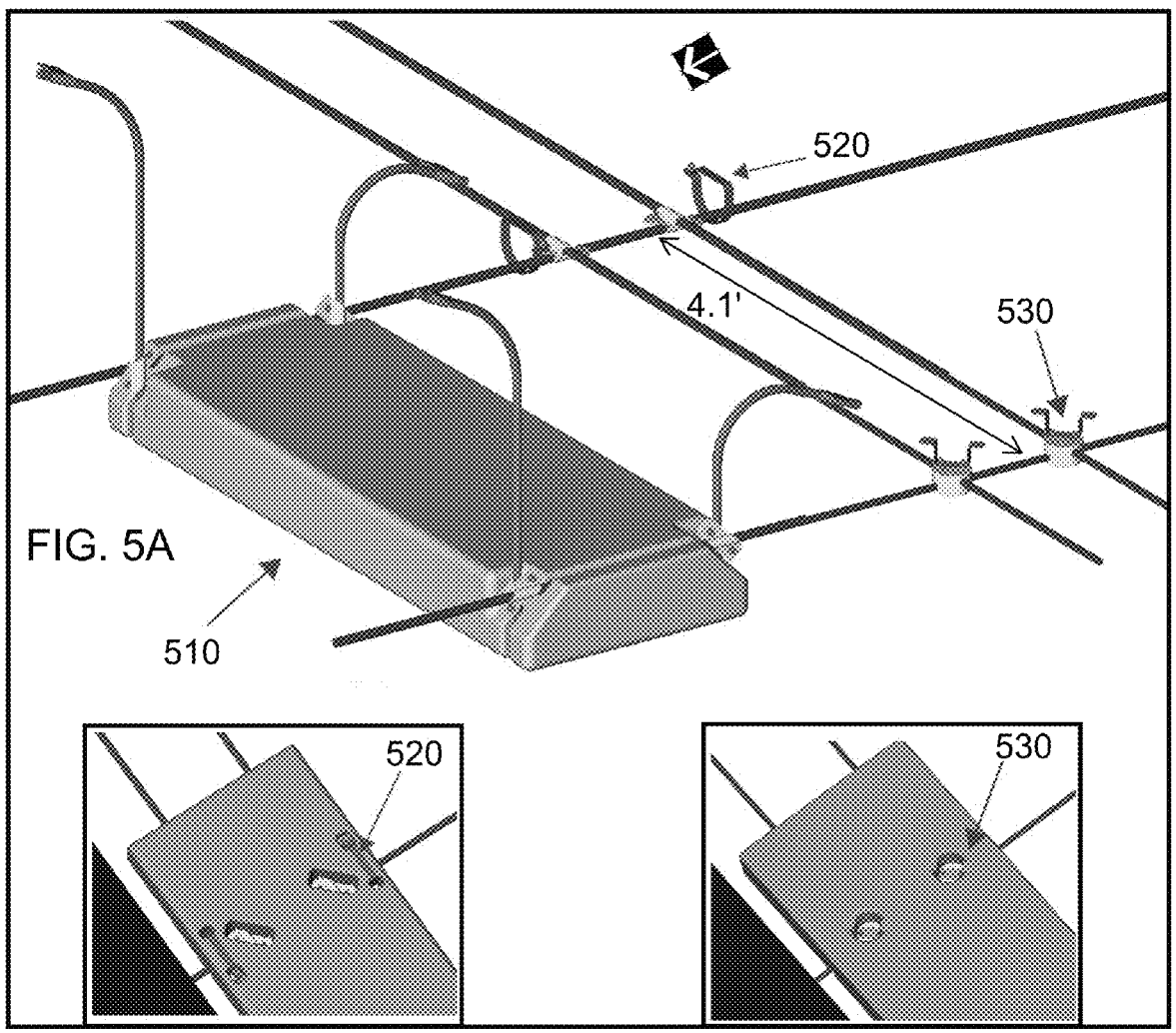
FIGS. 5A and 5B illustrate one embodiment of a solar float attached to a solar array grid.

FIG. 5A is one embodiment of the frames with strapping clamps, encapsulating a plastic float 510. In one embodiment, the float 510 has molded grooves in the bottom and sides to accommodate the U-frame geometry, as a tight glove would accommodate one's hand. The rigidity of the float 510, and its tight-fitting attachment to the U-frames, further stabilizes the frame and float assembly. In one embodiment, the float 510 also has similar grooves running along its top, into which the grid drops.

In one embodiment, the solar floats are smaller than the prior art's floats. This allow the solar panels to experience more convection and air flow from underneath, cooling the panels and improving their efficiency. In addition, in one embodiment, the solar panel is angled at a steeper angle to the sun than the prior art. Typically, the FRP solar array angle is 25 degrees from the plane of water. The additional strength of the FRP grid allows for increased wind loading due to the increased tilt angle. Prior art tilt angles are typically 12 degrees. A greater or steeper module tilt angle increases the frontal area of the array, thus increasing the wind loading. Typically, the prior art's plastic structural design doesn't allow for such high tilt angles of the solar panels because the array loading would be greater, which would exceed the allowable structural limits of the plastic or require an increase in anchoring placements.

The Floating Solar System in one embodiment utilizes high-density polyethylene (HDPE) for the floats, which are sized to be covered in shade by the solar panel approximately 95-100% of the time. The Floating Solar System utilizes the plastic (HDPE) for flotation, and as one embodiment shows, each individual float is used to structurally support a single solar panel. That is, the wind loading of adjacent solar panels do not transmit through adjacent floats.

Wing clamps 520 or metal tabs 530 bolt to the U-bolts attaching rods to each other (shown as element 330, FIG. 3A). The wing clamps 530 secure a walkway plank to the rebar grid. In one embodiment, the walkways are removable walkway floats which can be placed when the solar panel is to be serviced but can be removed when not needed.

Another embodiment of a system for securing the walkway float 540 to the grid is with metal or plastic straps 520. These walkway straps are illustrated again in FIGS. 7A and 7B. When the walkway float is a permanent fixture, metal straps are desirable, but when the walkway float is only used for temporary access, a plastic re-latchable plastic tie wrap can be used. The walkway float is used to access the solar panels for maintenance purposes, but unlike some prior art walkways, they are not a structural component of the FPV system. Therefore, far fewer walkway floats are required to construct large FPV arrays, at the benefit of significant installation cost-savings.

Figure 5B:
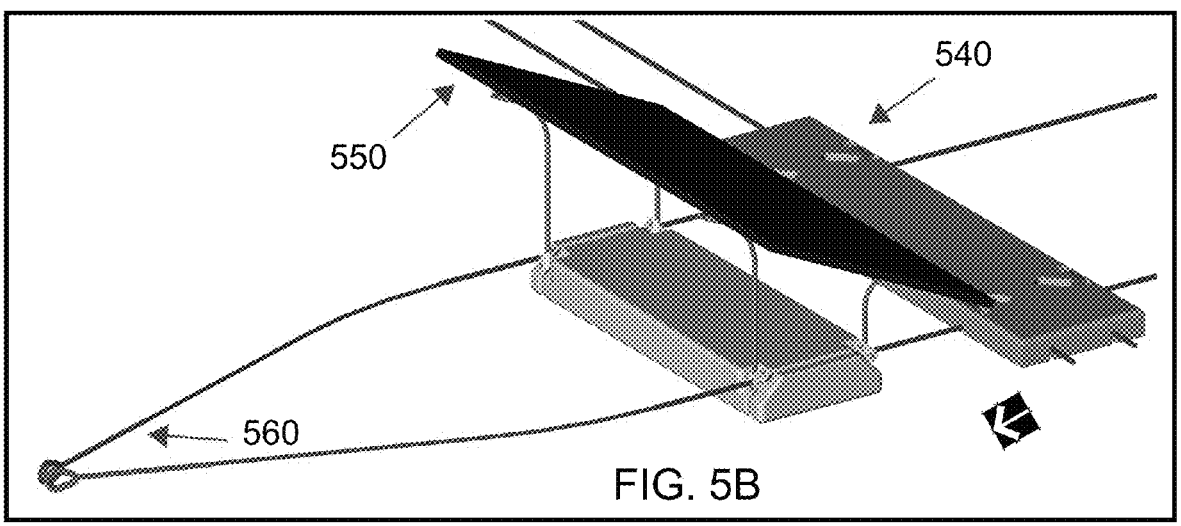

FIG. 5B is one embodiment of a completed unit of a FRP racking system, which includes the solar panel 550 attached to the frame, and the addition of the walkway 540. Similar to the solar float's grooves or molded cut-outs to mold around the FRP, the walkway is also configured to have cut-outs for the FRP grid. The walkways' cutouts run latitudinally and longitudinally underneath the walkway float 540. The walkway float 540 also has cut-out holes to fit over the grid's disk clamps, or other grid attachment. FIG. 5B also illustrates one embodiment of how the FRP rebar is terminated with the dead-end mooring attachments 560. This set of elements, the frames, floats, solar panel, and grid structure, are duplicated many times over to form large solar arrays.

Figures 6A, 6B:
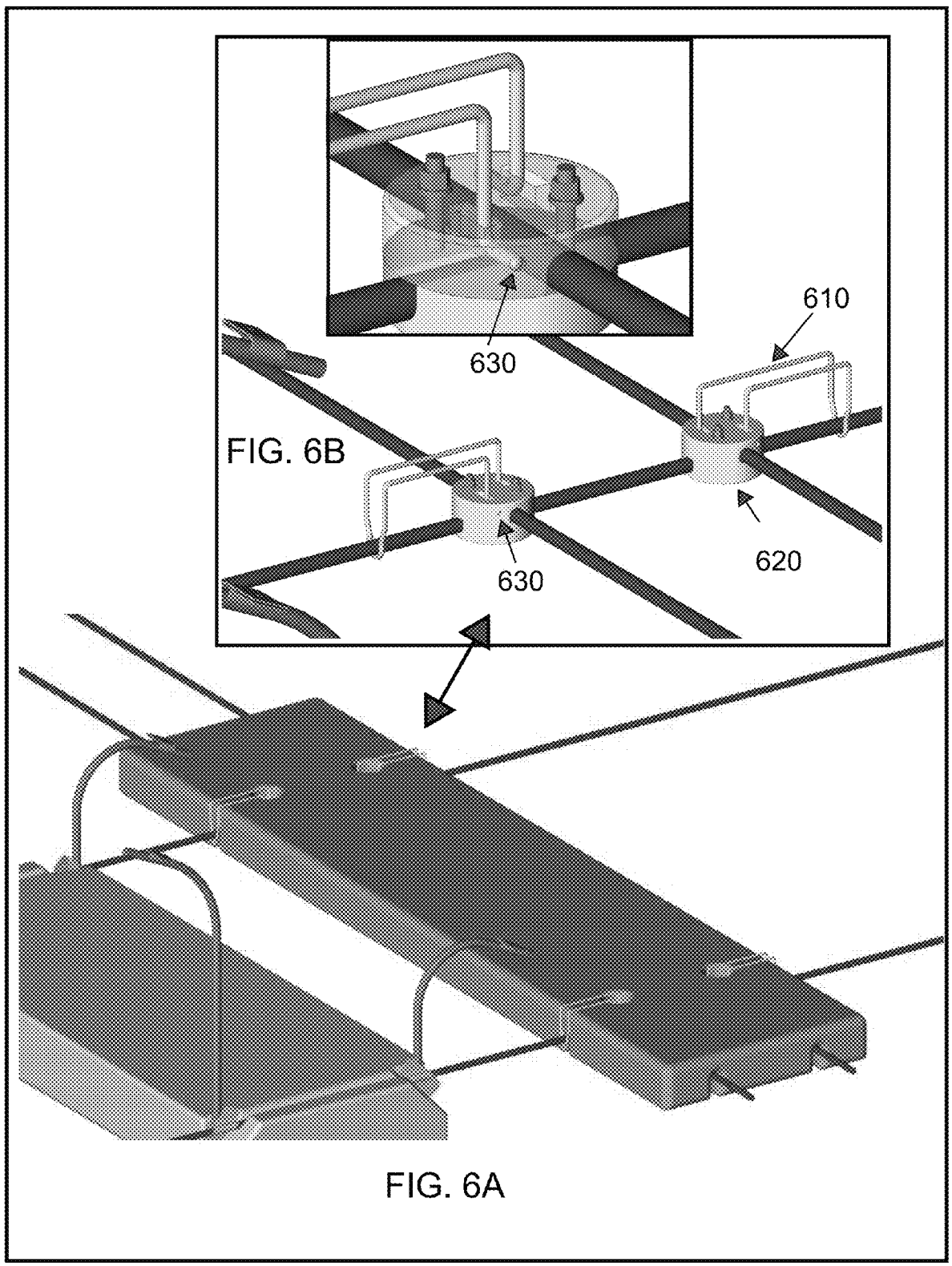
FIGS. 6A and 6B illustrate one embodiment of a removable walkway float attached to a solar array grid.

FIGS. 6A-6B illustrate another embodiment of the walkway float attachment to the grid. This attachment mechanism is a spring clip 610. The clip 610 wraps around the grid and walkway float and the two ends of the metal clip lock into two slots in the connector clamp 620. In one embodiment, he ends of the clip are bent horizontally and lock into two holes 630 in the clamp. In one embodiment, four clips are used to secure one walkway float. As can be seen the walkway in one embodiment has grooves in the bottom, which rest on top of the rods of the grid. In this way, the walkway is stabilized with its weight (and the weight of someone using it) distributed over four rods, two in each direction.

FIGS. 7A-7B are illustrations of one embodiment of the walkway attached when steel or plastic tie-wrap straps are used to secure the walkway to the rebar grid. The angled slots are the access windows for the clamps at the crossing of two of the cables. In one embodiment, there are doughnut holes through the walkway that fit over the clamps. These doughnut holes provide wall support for the walkway to strengthen it.

FIG. 7C illustrates one embodiment of the floating solar system configured as an array. Walkway planks 720 are placed either in the north-south dimension (wide walkway as shown) or in the east-west dimension (narrow walkway as shown, between rows of solar panels).

An alternative to using east-west walkways is to use a custom maintenance vehicle 730, which can travel along the racking system, without the use of walkways. In one embodiment, the custom maintenance vehicle 730 may transport service personnel along with their service tools. The custom maintenance vehicle 730 in one embodiment travels along the rails using a rail tire configuration that fits over the rail and can move over clamps. In one embodiment, the custom maintenance vehicle 730 may be an autonomous service vehicle. In one embodiment, an autonomous vehicle traveling along the rack may also be used for washing the solar panels.

Figure 8A:
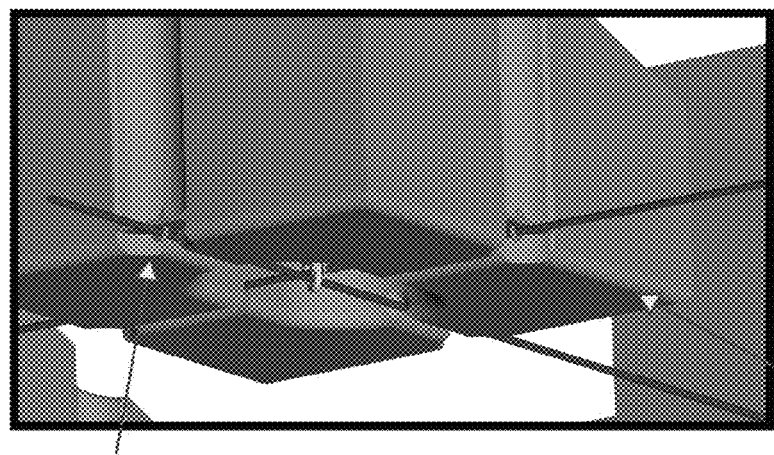
FIGS. 8A-8C illustrate embodiments of another embodiment of solar floats attached to a solar array grid.
Figure 8B:
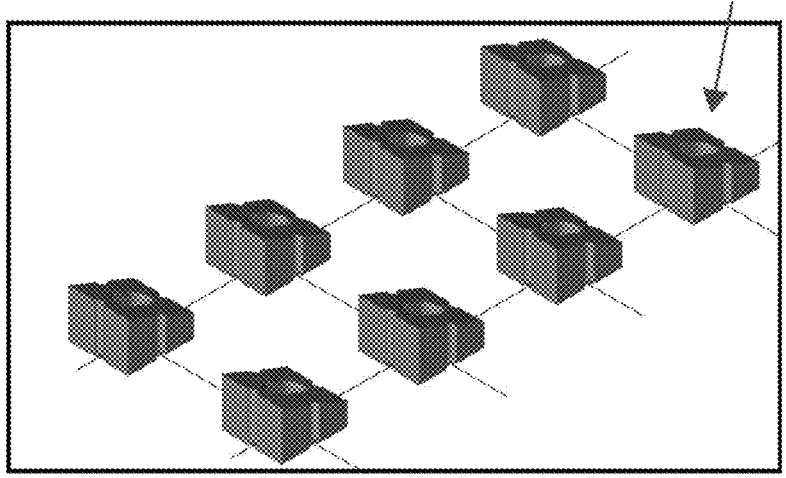
Figure 8C:
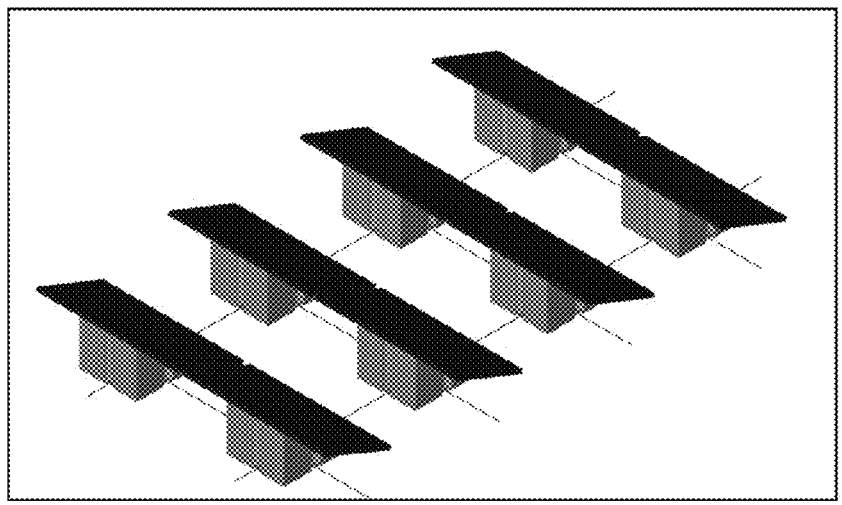

FIGS. 8A-8C are embodiments of another configuration of the solar floats. The grid is assembled with clamps as previously mentioned, however, this embodiment combines the solar panel support frame and float together as one piece 820. In one embodiment, the solar float 820 attaches to the grid with galvanized J-hooks 810. The advantage in using a one piece float mounting system is in its simplicity and reduced cost. However, using separate frames to support the solar panels have advantages of more easily providing a variation of module tilt angles, for optimizing the panels electrical efficiency.

Figure 9A:
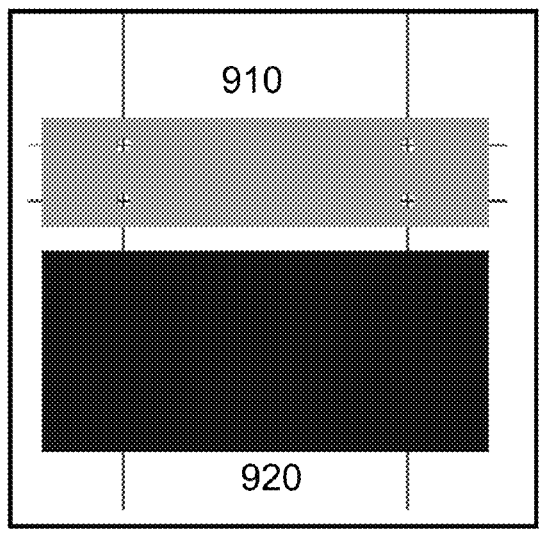
FIGS. 9A-9C illustrate a top view and a side view of a portion of one embodiment of a floating photovoltaic (FPV) array.

FIG. 9A is a top view of one embodiment of the grid, frame, solar float, solar panel module, and walkway plank floating solar system. From a top perspective, the solar module 920 covers many of the described parts, so only the solar panel module, walkway 910 and grid are visible in this figure. This also means that the plastic solar float generally is not exposed to sunlight, because it is covered by the solar module 920. This reduces the wear and tear due to UV light, and extends the life of the solar float.

Figure 9B:
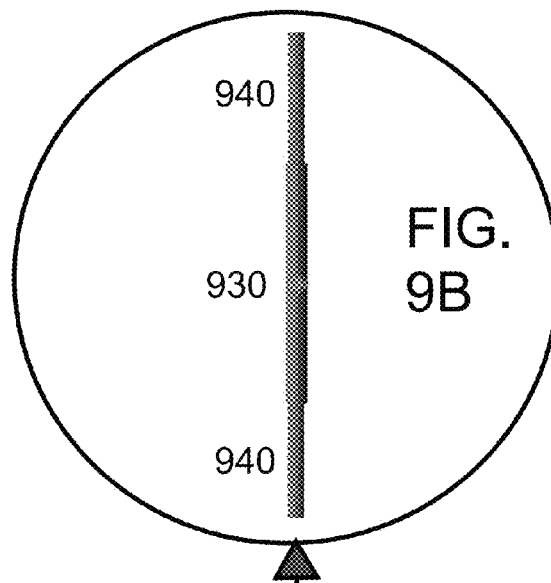
Figure 9C:
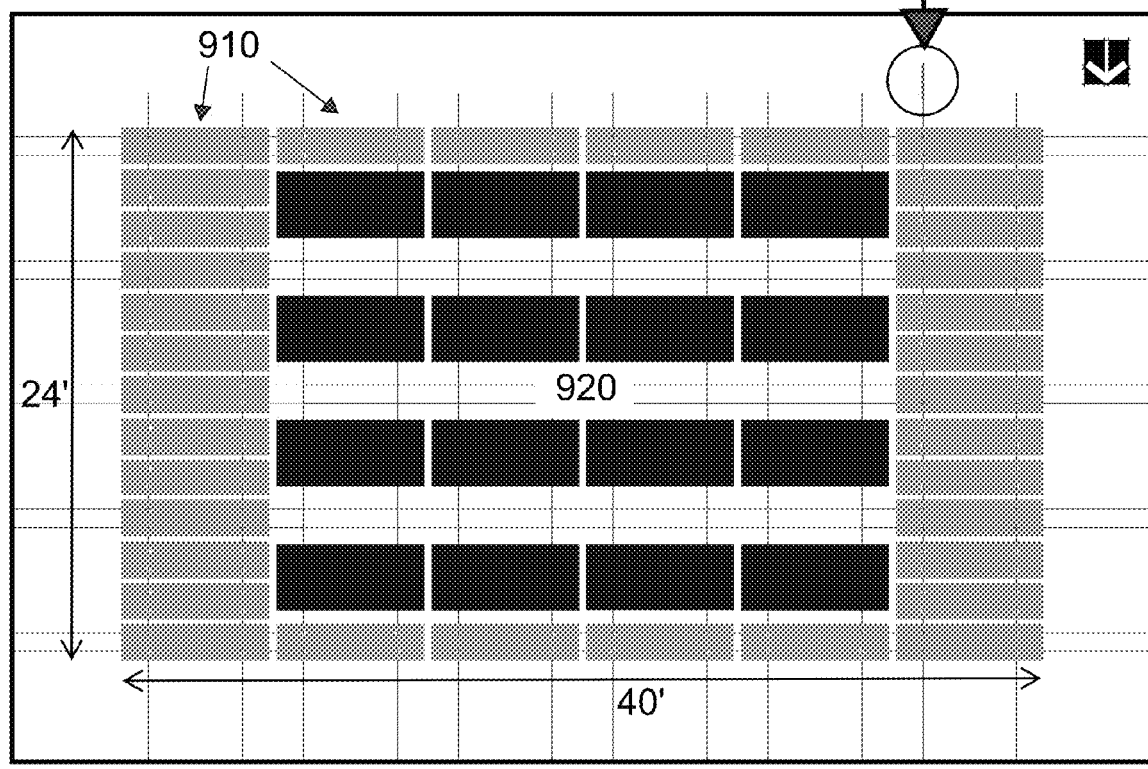

FIG. 9C is a top view of one embodiment of an array of solar modules and walkway floats configured together to form a solar array connected together by means of the grid. The walkways in this figure are contiguously connected and surround the solar panels. In some embodiments, there may also be walkways between the solar panel rows, or columns. In one embodiment, a set of solar panels surrounded by walkways is a floating solar array. A set of such arrays make up a whole floating solar system. Exemplary dimensions are provided in this figure. In one embodiment, individual floating solar arrays are coupled to adjacent solar arrays to make up an entire solar system. In one embodiment, they are coupled via rebar coupling.

FIG. 9B is a top view of one embodiment of a rebar coupling. Once an array is assembled (FIG. 9C), it is joined to an adjacent identical array to make the array larger. To join the ends of the rebars together, the rebar ends of two adjacent grids 940 are coupled together with a coupler 930. FIG. 20 illustrates one embodiment of a rebar coupler that may be used.

Bifacial Solar Panel

In one embodiment the floating solar system described may use bifacial solar panels which have the benefit of collecting sunlight from both surfaces of the solar panel. Typically, a bifacial installation requires steeper tilt angles and higher module distance from the "ground" plane surface for maximizing the albedo potential. However, a floating solar system using an FRP grid system is strong enough to account for the higher wind loads associated with higher tilt angles and raised solar panel heights. The FRP grid also provides a continuous plane of attachment points when an albedo plane of white material is affixed to the grid. This albedo plane of white plastic, fabric or metal, clips or ties onto the FRP rebar grid. In one embodiment the albedo plane uses J-hooks and threaded nuts to attach to the grid.

In one embodiment there are elevated bifacial solar modules. Bifacial modules are most efficient at capturing back side reflective light (potential electric energy) when they are elevated off the ground about one meter in height. Plastic floating solar structures won't allow this because they are not strong enough (without adding more structural support) to withstand the extra wind loading of elevated panels, but an FRP structural framework can withstand this additional wind loading.

Figure 10A:
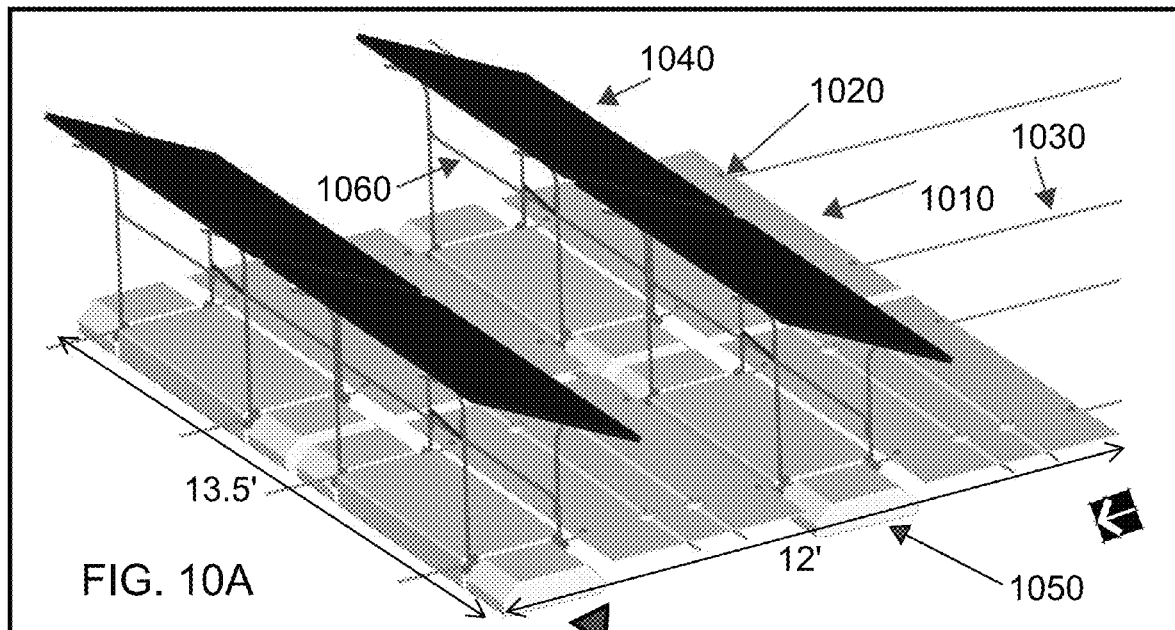
FIGS. 10A-10C illustrate perspective and top views of one embodiment a bifacial FPV array.

FIG. 10A is an illustration of one embodiment of a bifacial solar panel 1040 array configuration with an albedo plane 1010. The albedo plane 1010 is a reflective material attached to the grid 1030. The albedo plane 1010 may be made of white fabric, plastic, or metal. In one embodiment, the albedo plane's plastic or metal plates are contoured so that they form over the rebar grid profile. In one embodiment, the plates provide some shear structural support to the grid and allow for a tighter fit for the albedo plane to affix to the grid structure. Contouring the plates around the rebar also strengthens these sheets and provides an attachment mechanism for fastening—in one embodiment using the J-hooks, washers and nuts 1020, FIG. 10B.

Figure 10B:
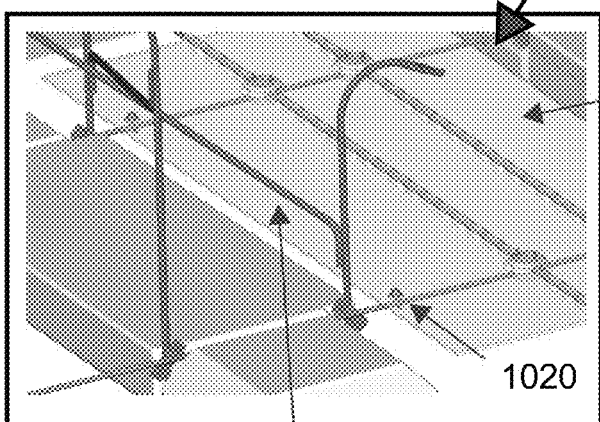

FIG. 10B also illustrates one embodiment of cross-bracing piece 1060 between the two U-FRP frames. The cross-bracing in one embodiment extends in an X-shape between two frames. In one embodiment, the two cross-bracing elements may be fixed to each other in the center where they meet. Because bifacial panels require sufficient clearance above the albedo plane, the U-frames may have additional cross-bracing or lateral support because of their extended height. The cross-bracing may attach from the front portion of a first frame to the back portion of an adjacent frame, providing an angled cross-bracing element.

The uplifting of wind on the array which increases in force when the solar panels are elevated (as shown), can be further mitigated by adding water ballast to the solar floats. In one embodiment, the solar floats 1050 are made specifically for bifacial applications, i.e., the longer float footprint increases the albedo plane's efficiency. Lengthening the solar float increases the reflective albedo surface by less than 5%, therefore, the extra bifacial energy gain is estimated to be a 1% increase. However, the additional buoyancy in the float favorably compensates for the added weight gain of the albedo plane 1010. In one embodiment, the additional weight of the albedo sheets 1010 is between 10-30 lbs. per panel.

Figure 10C:
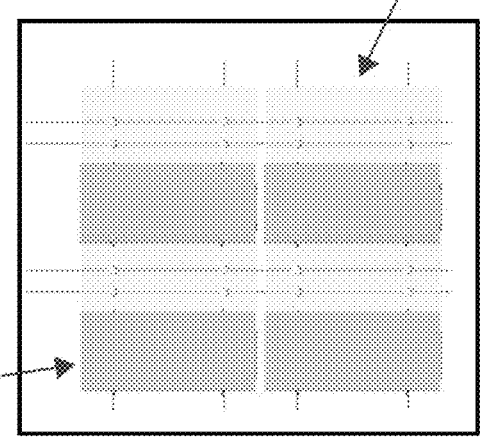

FIG. 10C is a top view of the embodiment of the bifacial solar array. Walkway floats are not shown in this embodiment although they could be included or substituted for portions of the albedo plane. If the albedo plane plastic plate is used as a walkway additional FRP grid rods may be incorporated into the design to support the additional weight. Material and design choices such as these will change from site to site. Anchoring and array loading requirements are site-specific, because many different environmental constraints may come in to play.

Azimuth Tracking System

In one embodiment, the floating solar system provides an azimuth tracking system, in which the solar panel orientation can be altered to follow the sun. Tracking solar systems gather an average of 25% more electrical capacity or KWH than fix tilt systems. Central to all said tracking systems is a rotating support for the solar panel that turns on its vertical axis by means of a linkage rod. In one embodiment, the linkage rods are hinged to account for wave movement and variable water height. The linkage rods connect to a motor system that pulls and pushes the rod in relationship to the sun location in the southern sky via a motor and control system.

In one embodiment of an azimuth tracking floating solar system, a solar panel rotates from east to west throughout the day. It is not shown, but assumed that the rod linkage which attaches to the float to rotate the float is connected to many other floats along the row of solar panels so many solar panels rotate all at the same time. The rod linkage is connected to a gear motor and motor controller which operates according to a defined computer program.

In one embodiment the azimuth tracking floating solar system includes solar float which rotates freely, and supports the solar panel, and a fixed outside portion, which is attached to the grid and provides support for the freely rotating solar float. In one embodiment, the outside portion is also a float, providing additional buoyancy. However, the outside portion may be a sleeve, or other non-buoyant element.

Figure 11A:
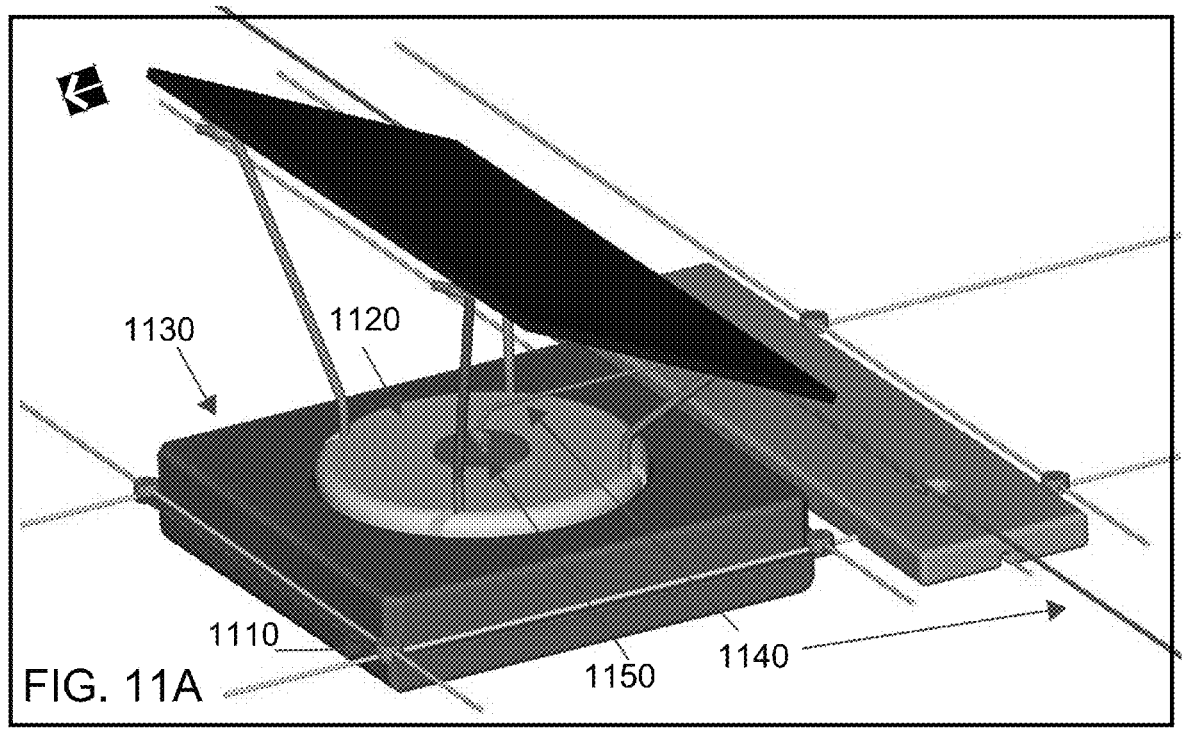
FIGS. 11A-11B illustrate one embodiment a tracking FPV system.

FIG. 11A is one embodiment of solar float for an azimuth tracking system. The central float 1120 is sits inside another outside supporting float 1130.

In one embodiment, the outside float 1130 is rectangular and the central float 1120 is cylindrical. The rectangular float 1130 acts as a bearing sleeve for the cylindrical float 1120. In one embodiment, a disk clamp 1110 is used to fasten the rods to each other, and the disk clamp 1110 affixes the outside float's corners to the crossing rebar. In one embodiment, a U-bolt and two nuts are used at each corner. The two plastic floats 1120 & 1130 in one embodiment are dissimilar in plastic composition so that their coefficient of friction remains low providing two good bearing surfaces. The outside float 1130 is fixed to the FRP grid and supports the weight of the array structure. The cylindrical float 1120 only needs to support the weight of the solar module and its supporting frames. Water can be added to the cylindrical float to provide ballast which resists wind uplift. Added water also provides buoyancy compensation so the float's centerline resides within the centerline of the rectangular float. The rectangular float acts as a sleeve bearing for the cylindrical float.

In one embodiment, a rod linkage 1140, connects to the center of the cylindrical float 1120. When the portion of the rod linkage that runs parallel to the walkway moves in an east to west direction, the cylindrical float 1120 rotates eastward or westward within the rectangular float 1130. U-frames and a solar panel are connected to the cylindrical float in a similar manner as described earlier in the fixed tilt configuration, but now because the cylindrical float 1120 rotates, the solar panel rotates along with the cylindrical float 1120. In one embodiment, the U-frame locks into the float without any fastening—except for the solar panel. The ends of the U-frame are sprung open at assembly, and spring back into place locking the float into the frame's base. A slight angled "draft" between the frame and float provides this locking assembly. In one embodiment, the linkage 1140 which rotates the float 1120 at its center 1150, also attaches to the adjacent floats in the row, connecting the control to a motor (not shown). In one embodiment, the motor is controlled by a microprocessor which actuates the linkage according to the sun's position. The linkage will then yaw floats, and thus solar panels, in unison. In one embodiment, a single motor may control a row of solar panels.

Figure 11B:
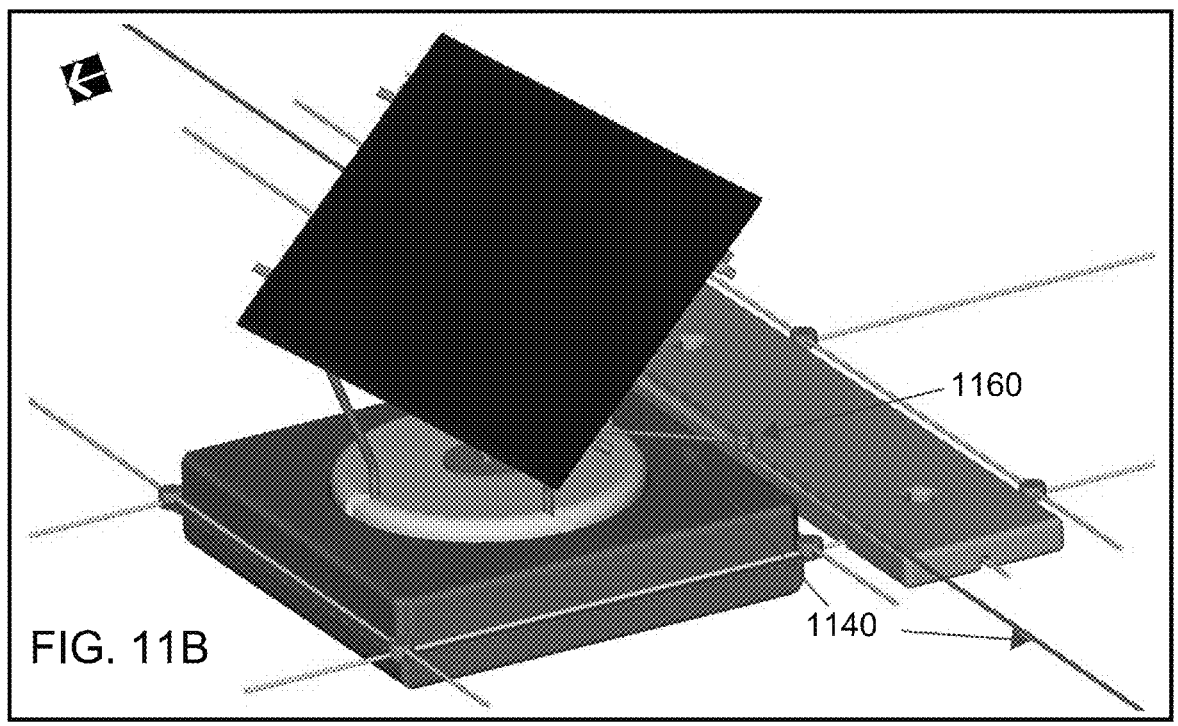

FIG. 11B is one embodiment of the same azimuth floating solar tracking system showing the linkage rod having moved westward from the previous drawing (FIG. 11A), causing the solar panel to rotate 45 degrees to the west. The rod linkages 1140 are in one embodiment equipped with pivot points or hinge joints 1160 allowing for freedom of linkage movement. This allows adjustments due to varying changes in float elevation as water waves occur. In one embodiment, another such joint is located at the top of the cylindrical float 1150. This joint allows the cylinder float 1120 to rise up and down in the water independently from the outside float 1130.

In one embodiment, a bifacial covering may be added to the grid and bifacial solar panels are used. By adding bifacial panels to a tracking system, increased electrical production can grow beyond 35%, when compared to fixed tilt systems. The float structures and albedo planes are colored white to reflect as much light as possible to the backside of the bifacial panels.

Figure 12:
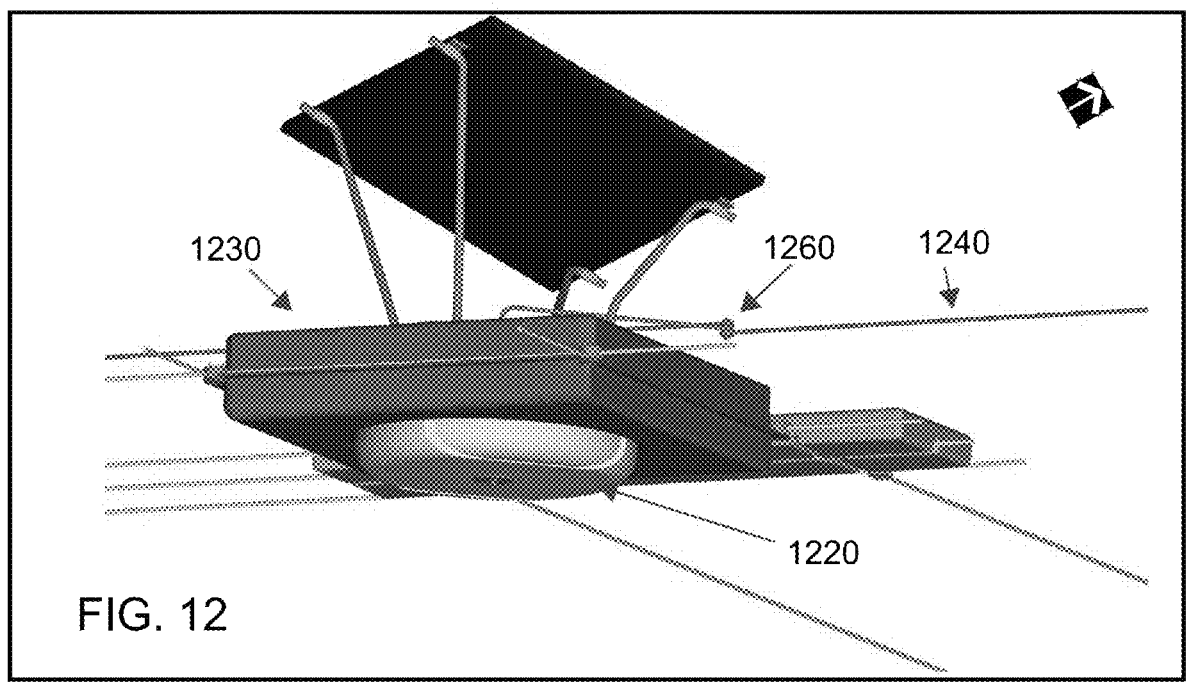
FIG. 12 illustrates a bottom view of the tracking FPV system.

FIG. 12 is one embodiment of an azimuth floating solar tracking system seen from a perspective below the waterline. In one embodiment, the rotating central float 1220 is deeper than the outside sleeve float 1230, extending beyond the sleeve float's bottom. The central float's addition depth assists in maintaining sufficient surface contact with the outside float, by increasing the bearing surfaces to keep the central float 1220 and thus the solar panel correctly positioned as the outside sleeve float 1230 moves independently in the vertical dimension with winds and waves. Additionally, in one embodiment the central float 1220 is weighted with water ballast to prevent uplifting, therefore, its volume is sized accordingly.

Figure 13A:
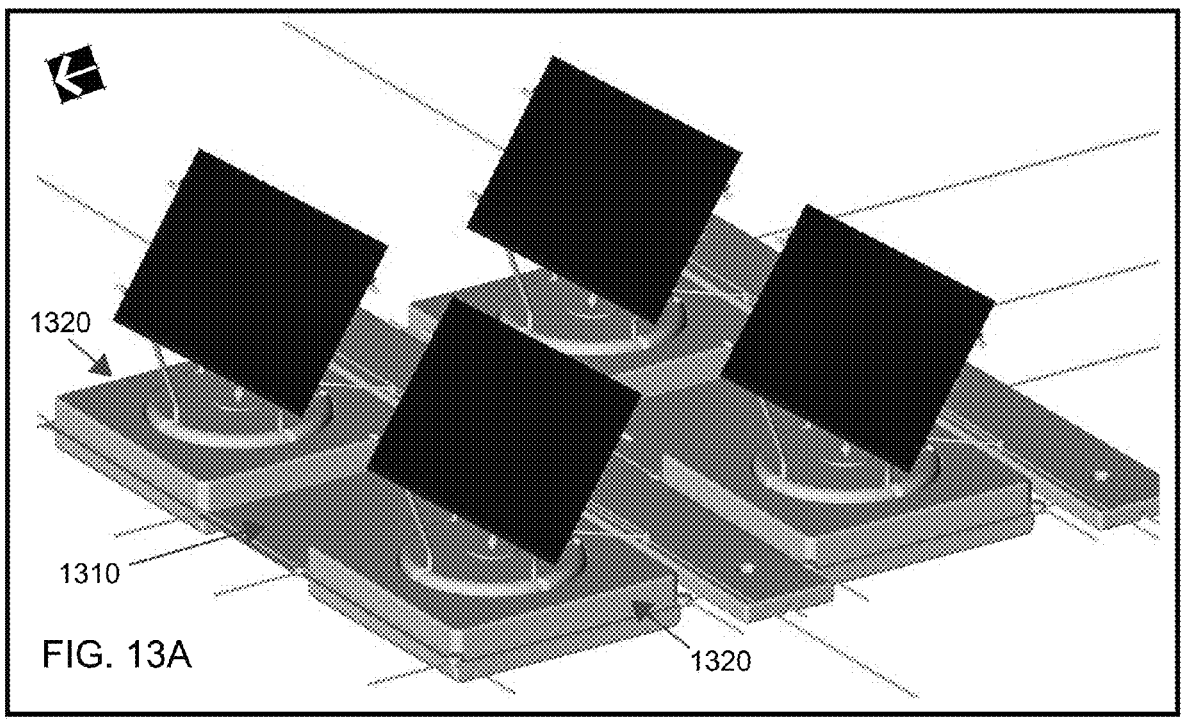
FIGS. 13A and 13B illustrate one embodiment a set of tracking FPV elements.

FIG. 13A is one embodiment of an azimuth floating solar tracking array equipped with albedo planes 1310 mounted between the outside sleeve floats 1320. The albedo planes reflect light onto the back side of the bifacial solar panels.

Figure 13B:
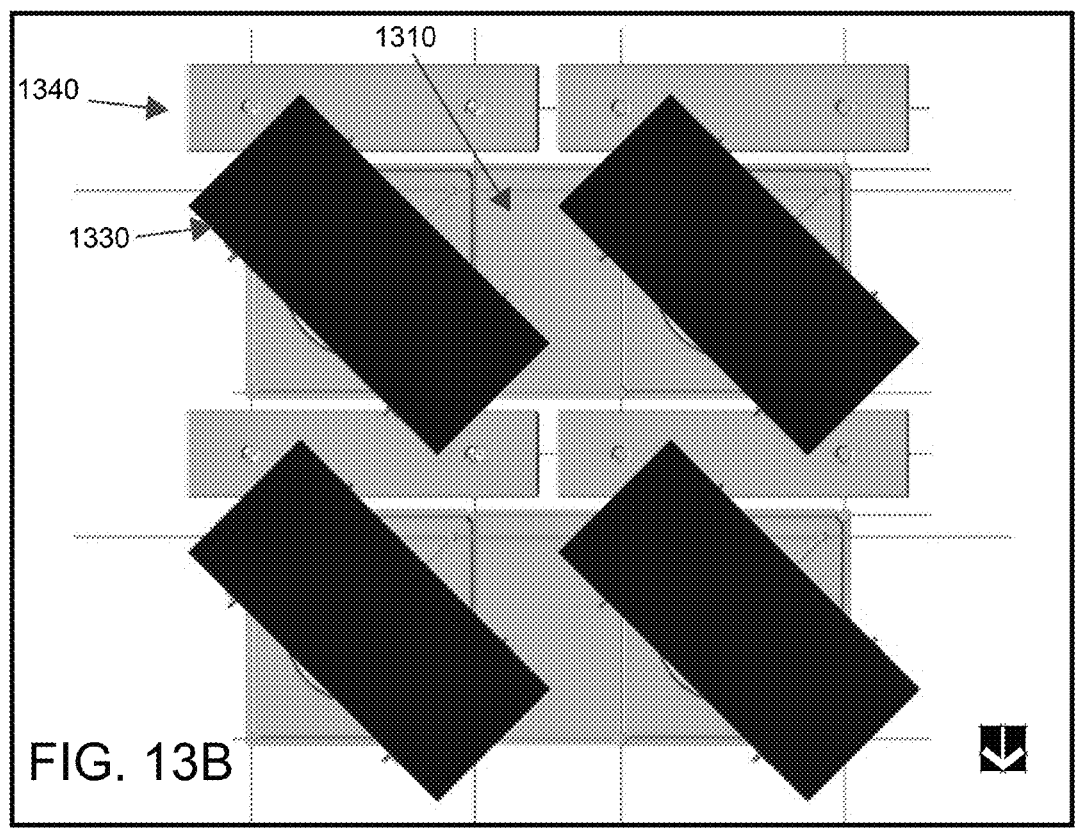

FIG. 13B is the top view of the same embodiment of FIG. 13A. The solar panels 1330 are rotated 45 degrees to the west. In one embodiment, the lightly colored walkway floats 1340 and albedo planes 1310 cover 50-98% of the water's surface, to maximize the footprint of reflected light. In one embodiment, the walkway floats and albedo planes cover at least 90% of the water's surface.

Figure 14A:
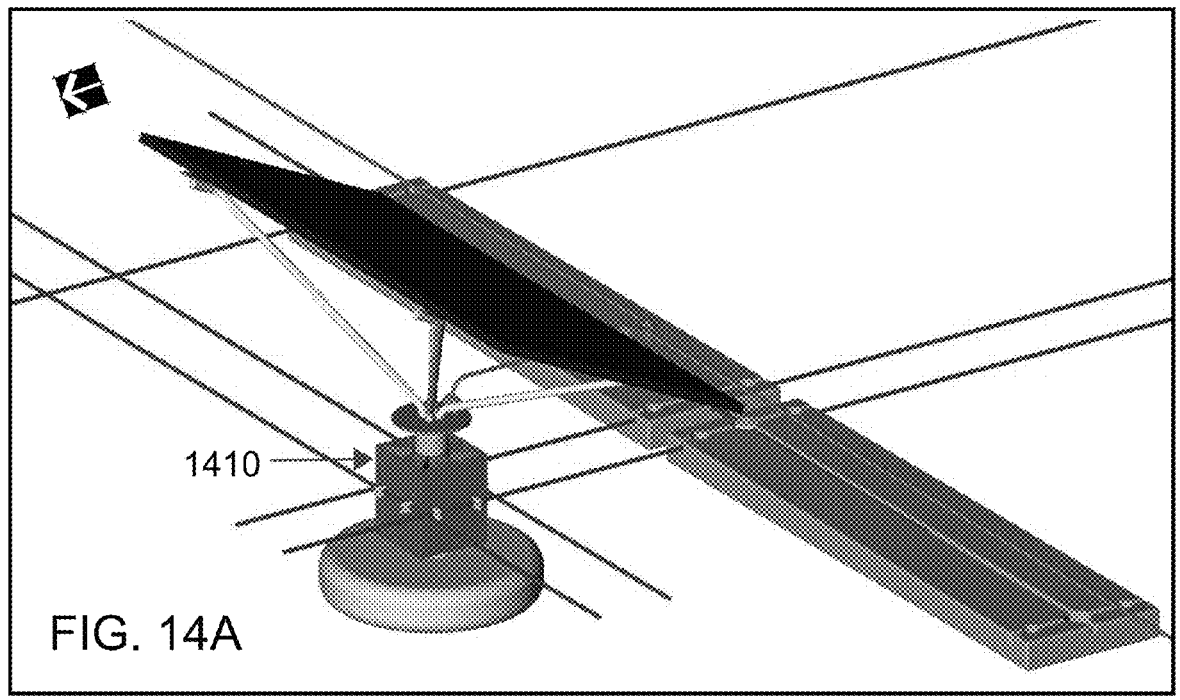
FIGS. 14A and 14B illustrate another embodiment a tracking FPV system.
Figure 14B:
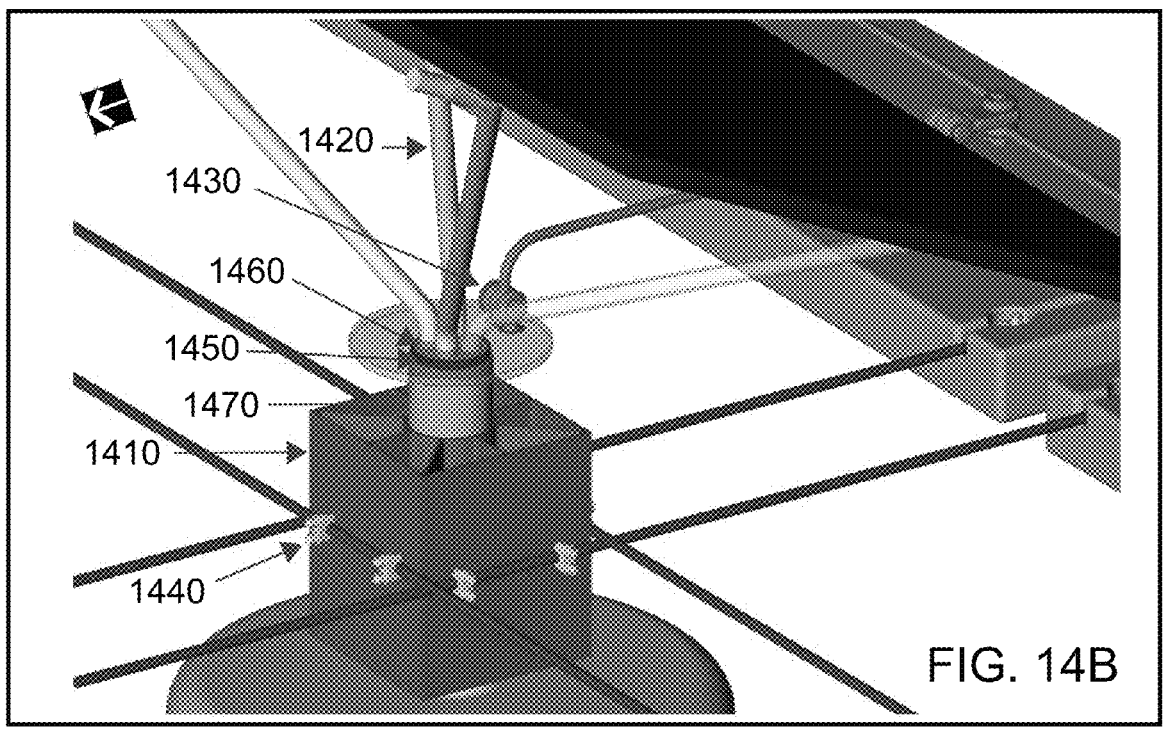

FIG. 14A is one embodiment of an azimuth tracking FPV racking system using an extruded collar 1410 for housing the sleeve bearing; a zoomed in view drawing is shown in FIG. 14B. This embodiment is a longer and narrower sleeve bearing system using a single float. In one embodiment, the rebar frames are encapsulated—using an epoxy or concrete compound—within an HDPE pipe sleeve. In one embodiment, a UHMW plastic liner is placed on the outside of the black HDPE pipe sleeve to maximize the bearing surface and to reduce bearing friction and increase the bearing's strength and wear. An extruded aluminum collar then wraps around the UHMW bearing sleeve to provide a secure and rigid bearing structure. The rectangular extruded aluminum sleeve is then bolted to the rebar members.

The collar 1410 in one embodiment is made of aluminum. The collar 1410 is fastened to the rebar grid with rebar clamp 1440. The solar panel frame tubes 1420 are affixed within a tube 1450. The tube 1450 in one embodiment is high density polyethylene HDPE tube. In one embodiment, the frame tubes 1420 are attached using poured epoxy or cement encapsulate 1460. In one embodiment, a separate bearing liner 1470 provides the necessary bearing layer between the HDPE tube and aluminum collar sleeve. The bearing liner 1470 in one embodiment is ultra-high-molecular-weight-polyethylene (UHMW). The solar panel is supported by a solar float, attached below the collar 1410. Although the solar float is shown as a relatively small cylindrical float, its size and shape may be altered. Its purpose is to provide some amount of lift so the full weight of the solar panel is not on the grid. The solar panel's orientation may be altered using a tracking linkage 1430, as was described previously.

Figure 14C:
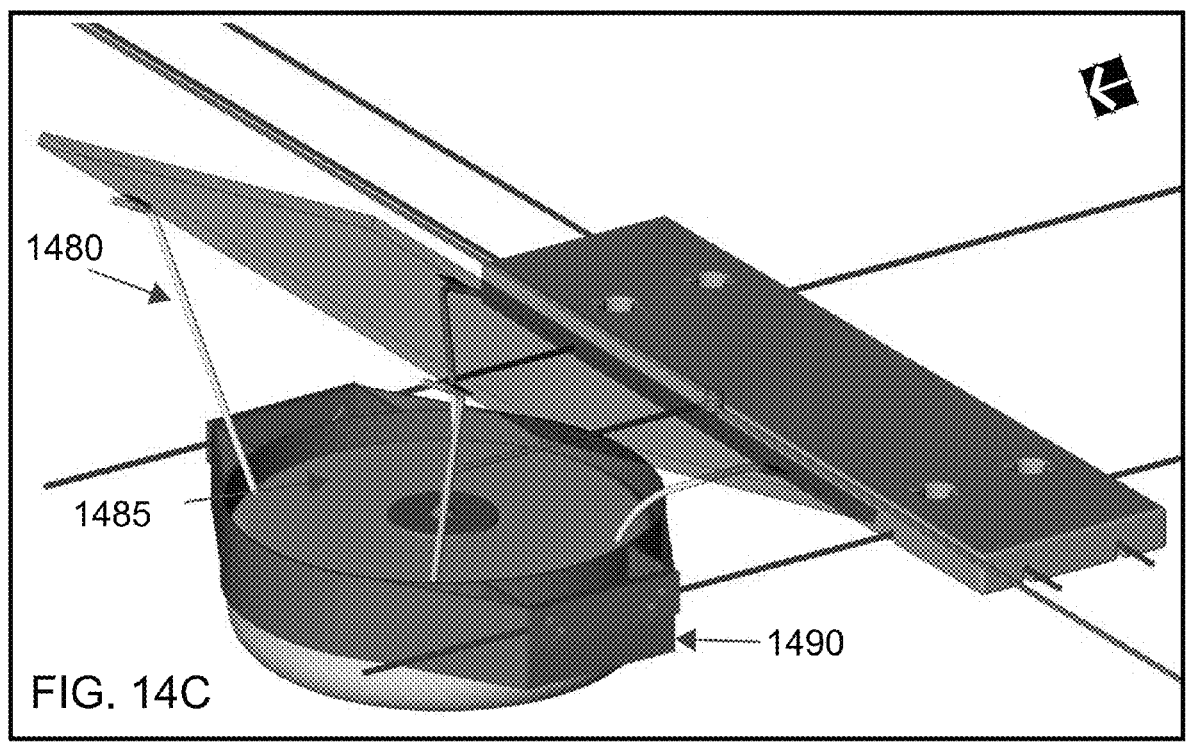
FIG. 14C illustrates another embodiment of a tracking FPV element.

FIG. 14C is one embodiment of an azimuth tracking FPV racking system where the solar panel frames 1480 are coupled into the rotating float 1485 and a metal framework 1490 affixed to the grid, provides a bearing sleeve for the rotating float.

Low Tilt Angle Array

FIG. 15A is an embodiment of a low tilt angle floating photovoltaic array. The entire array is elevated and supported by an elevating float 1550. In one embodiment, the elevating float is an irrigation pipe, and thus the array is elevated by the height of an irrigation pipe 1550.

In one embodiment a large diameter irrigation pipe is used to suspend the FRP fixed tilt racking system. In high wave environments where elevating the solar panels higher above the water is desirable, an elevating float can be used. One simple and cheap way to implement an elevating float is utilizing black irrigation HDPE pipe. Typically, irrigation pipes have thicker walls than blow-molded floats and can be welded, but blow-molded floats are usually less expensive. When the FRP diameter rod is sufficiently large, it is strong enough to span longer than one row spacing. In this fashion, an entire row of solar panels may be suspended by the elevating floats 1550 of the adjacent rows. To stiffen the FRP grid and to span such distances without using floats beneath the solar panels, larger diameter pultruded FRP rebar, pultruded FRP rectangular tubing, or pultruded FRP rectangular bar may be used in its place. Similarly, stiffening the grid can be achieved by increasing the frequency of rebar used in any one dimension.

In one embodiment, a large HDPE pipe that is easily found in the irrigation industry is used as the elevating float 1550. The ends of the pipe can be thermally welded closed to form a long pontoon pipe. This pipe serves as an economical method to add buoyancy and height to a floating array structure. In a sea environment where waves could break over the solar panels this design adds an additional barrier and elevation to the solar modules. In another embodiment, the elevating float 1550 may be rectangular or another shape.

The solar panel may be coupled to the elevating float 1550 via frames that wrap around the float. Adding a plate and/or small float on top of the pipe, provides additional height and three-dimensional structure to the FRP framework. The tilt angles of the modules are less aggressive than previously shown (typically between 0 and 15 degrees) to reduce the stress caused by severe and prolonged winds.

In one embodiment, the elevating float 1550 is an irrigation pipe that is an 8" to 36" diameter pipe, up welded into 100' lengths, with ¼" to ½" wall thickness. In one embodiment, the irrigation pipe is 2.5 feet in diameter. The irrigation pipe is closed with plastic welded plates—as HDPE pipe is welded as a standard industry practice. Alternatively, another type of elevating float 1550 may be used to provide similar height and stability.

In one embodiment, an attaching U-framed rod 1510 is around the large pipe 1550 and fastens to the FRP grid. In one embodiment, the attaching U-framed rod 1510 is coupled to the grid using strap clamps 1525. A supporting U-frame 1520 straps to the attaching U-framed rod 1510. In one embodiment, supporting U-frame 1520 and the attaching U-framed rod 1510 are attached using a second type of clamping strap 1535.

In one embodiment, single irrigation pipe section 1510 is sufficiently buoyant to support four solar panels with walkways. The walkways 1540 and solar float 1530 are elevated above the water. The rebar grid 1570 is typically 1.25" in diameter and sufficiently stiff to support the weight of solar panels mounted between the irrigation floats. If the weight of the specified solar panels bend the spanned rebar 1570 beyond an acceptable range of deflection, in one embodiment 12", then the solar float 1530 is replaced with an irrigation pipe ½ the diameter of the primary irrigation float 1550. Alternatively, the solar float 1530 is lengthened in height—below the grid—to add buoyancy. In one embodiment, there is a smaller pipe 1560 inside the irrigation pipe 1550 that runs a part or the full length of the irrigation pipe. This smaller pipe is filled with water and provides a stable ballast source to the racking system in the event of high winds and uplifting.

The solar panels 1580 are positioned over the supporting U-frame 1520 on the elevating float 1550, and a supporting U-frame 1590 attached over the solar float 1530 or secondary elevating float. In one embodiment, two adjacent irrigation pipes 1550 and a solar float 1530 positioned between them support twelve solar panels in a relatively flat convex position, as shown in FIG. 15C. In severe high wind and wave loading environments, smaller sized solar panels of 2 sq. meters and smaller are required for this floating solar system, because of their increased structural integrity.

Figure 16A:
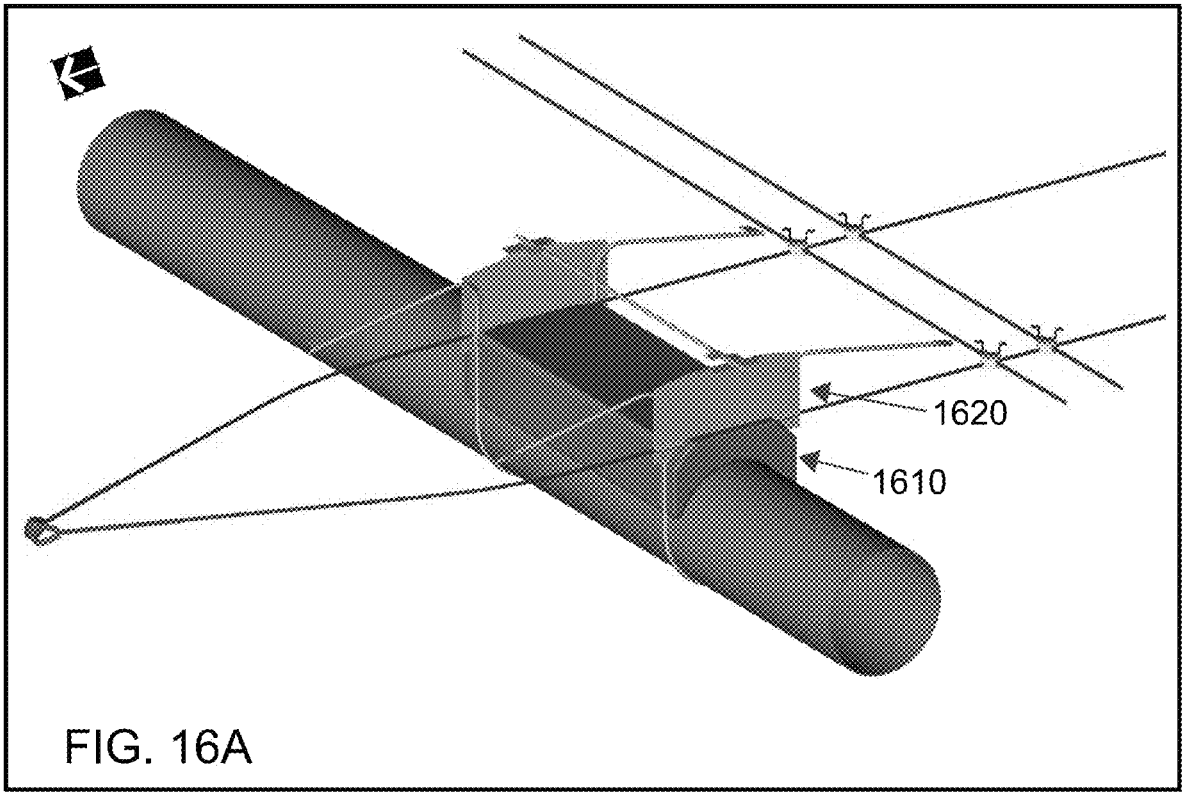
FIGS. 16A and 16B illustrate another one embodiment a FPV array using a different support structure for the solar panels.
Figure 16B:
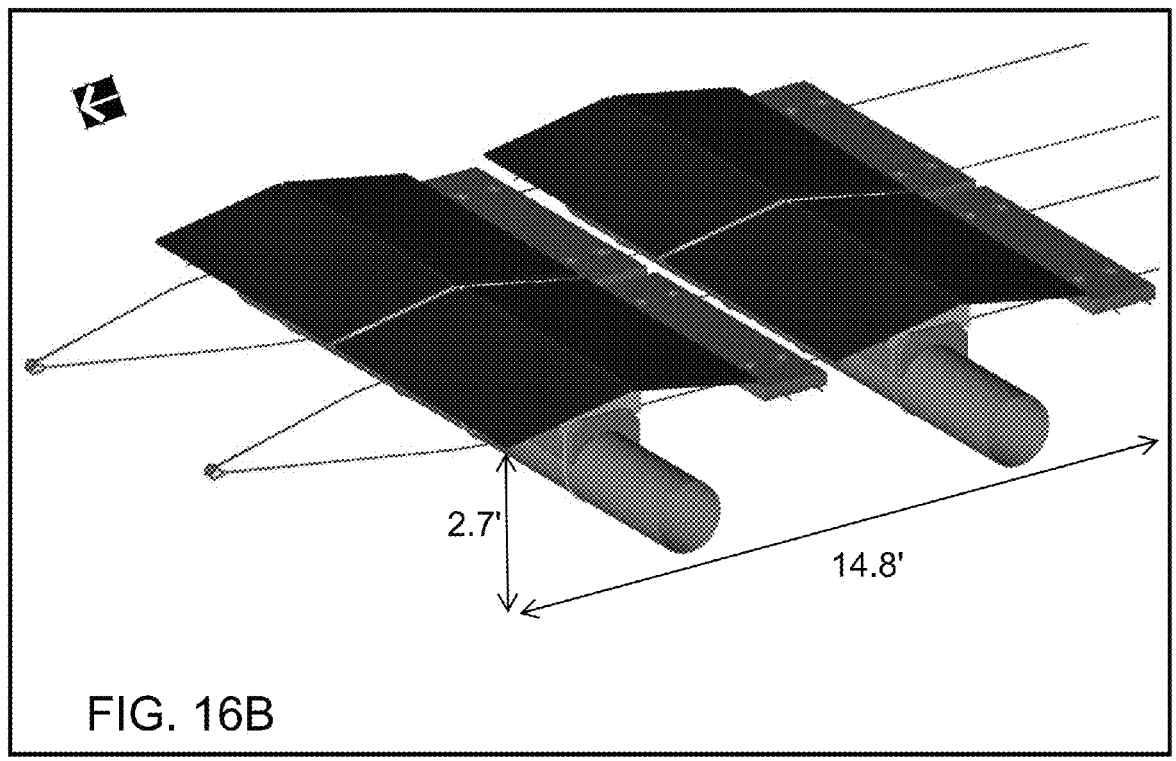

FIG. 16A illustrates one embodiment of two plates 1620 that both elevate and support U-frames for supporting a solar panel, to increase the elevation above the water. The bent plate 1620 formed with structural ribbing or radial bends for added strength, slides into a modified solar float 1610. The modified solar float 1610 has a base which is shaped to match the curvature of the irrigation pipe. Solar panels are mounted to this framework, as shown in FIG. 16B. The tilt angle of these panels remain low, however, their height above the water level remains high—the preferred configuration in high wind and wave conditions.

Assembly and Coupling Elements

FIG. 17 is one embodiment drawing of a rolled up grid 1710. In one embodiment, the grid is assembled off-site, transported to the job site in a compacted form, and when delivered, then unrolled 1720. Experimental results show that ½" FRP rebar grid rolls into a seven foot diameter circle. In one embodiment, a motorized spooling system is used to roll the grid. A pre-assembled grid is more cost-effective then assembling the grid in place. The mat or grid one embodiment is fabricated with connector clamps at the factory and transported to the solar site as a large roll of FRP 1710. Once delivered to the site, the grid is unrolled 1720 for the floats to attach and deploy. This pre-assembly of components cuts costs during the construction phase of the solar installation.

FIG. 18A-18D illustrate embodiments of molded sections of pultruded FRP rods. During the polymer curing process in FRP manufacturing, the factory can deform the molded piece to create a flattened section of the rod 1810. This deformation can become an intersecting point for an attaching FRP piece 1820. The deformation can be of any shape or depth 1830. These deformations can add flat surfaces to the rods which aid in the attachment with other rods. Adding deformations to the rods at precisely measured intervals locates the adjoining piece at the time of attachment. Another method for indexing placements of adjoining FRP pieces is to use a "hog ring" or ring staple 1840. Hog rings 1840 are an industry standard ring connection that are applied with pneumatic staple guns.

FIG. 19A-19C illustrates various embodiments of pultruded structural I-beam of FRP. The pultrusion process of fabricating FRP composites allow multiple configurations of shapes and sizes. However, FRP rebar or rod is one of the most cost-effective shapes to produce when considering its structural capability—especially under tensile structural loading. Nevertheless, alternative shapes and sizes of FRP may be better suited for the grid or other framework structure under different design conditions. The examples shown include one embodiment of an I-beam structural member (FIG. 19A) rectangular tubing FRP structural member (FIG. 19B), and one embodiment of a circular tube FRP structural member (FIG. 19C).

FIG. 20 illustrates one embodiment of an FRP rebar coupling. The use of this coupling was described earlier with respect to FIGS. 9A-9C. When rebar 2010 comes threaded from the manufacturer, the thread profile provides an ideal gripping surface for a split-coupling 2020. The split or clam shell coupling halves 2020 have a mating thread profile to the rebar, so when they clamp to the rebar they hold the rebar tightly with the force of multiple threads. A single ⅜" bolt 2030 provides enough clamping force to keep the split-coupling halves from separating outward, thereby maintaining a positive engagement between surfaces. The couplings' multiple threads resists the tension load on the two rebars, not the bolt. Teeth along the clam shell halves, a taller backbone, heavier wall thickness and adding perimeter clamping bolts are additional methods for increasing the working tensional loading of this clamp.

Figure 21A:
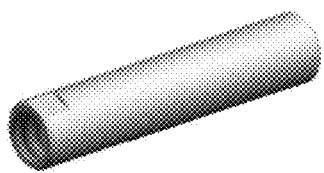
FIG. 21A-21D illustrate four embodiments of FRP couplings.
Figure 21B:
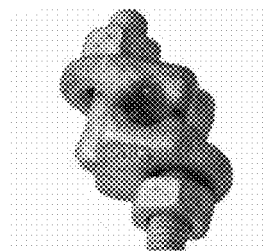
Figure 21C:
Figure 21D:
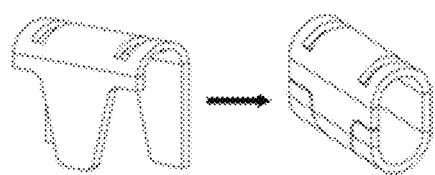

FIG. 21A-21D illustrate four embodiments of an FRP threaded coupling connector. FRP rebar manufactured with threads is the preferred embodiment. FIG. 21A illustrates screw-in coupling, which can be used with rebar having threads so that the coupling threads and rebar threads match. The coupling of FIG. 21A in one embodiment is a steel coupling having threads on both ends such that two rods would thread into either side of the coupling—very similar to a rigid metal pipe coupling where the two threaded pipes screw into the threaded coupling. Once installed this does not allow the two rebars to be decoupled, similar to the plumbing pipe scenario. FRP rebar lengths are coupled end-to-end in this manner. Couplings may have different sizes on each side, enabling the coupling together of rebar lengths together of different sizes. FIG. 21B illustrates one embodiment of an FRP clamping coupling connector. Two or more of these clamp connectors are used to clamp or lap together rebar lengths. The two saddles that encapsulate the rebar provide strain-relief and won't damage the rebar surface under the significant clamping force. FIG. 21C illustrates one embodiment of an FRP threaded coupling connector with a welded eye-ring. This connector has threads on one end and a circular "eye" end on its other end. Two of these eye-couplers mate at the eye ends and a through-bolt fastens the two eye-couplers together. FIG. 21D illustrates one embodiment of an FRP crimping coupling connector. The FRP rods are placed in parallel with one another and a crimp tool crimps the metal connector around the rebar. The crimping coupling is made from stainless or galvanized steel, in one embodiment.

Figure 22A:
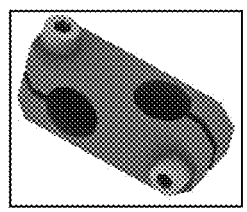
FIG. 22A-22E illustrate five embodiments of FRP connectors.
Figure 22B:
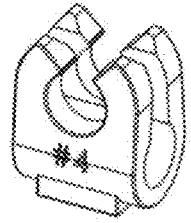
Figure 22C:
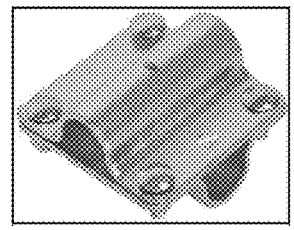
Figure 22D:
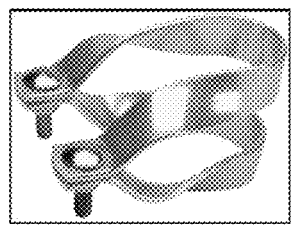
Figure 22E:
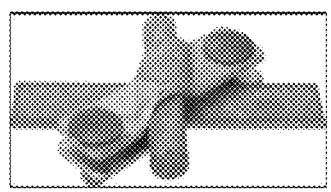

FIG. 22A-22E illustrate five embodiments of FRP or steel cable cross-clamping connectors. FIG. 22A illustrates one embodiment of a connector with two machine bolts to provide the clamping force to connect. FIG. 22B illustrates one embodiment of an FRP press-fit connector. This is an injection molded piece of plastic and provides a limited clamping pressure to the rebar pieces. FIG. 22C illustrates one embodiment of an FRP cross-connection attachment. Made of stamped metal or molded plastic, bolts provide the clamping force, pressing the two plates together. FIG. 22D illustrates one embodiment of FRP cross-strap connection attachment. FIG. 22E illustrates one embodiment of an FRP bar strap cross-connection attachment. An insert of molded plastic may be placed in between the two pieces of rebar to prevent deformation when the rebars' points of contact are clamped together. Other types of connectors may be used to couple the rods making up the grid, and to couple other parts to the grid, such as frames.

Figure 23A:
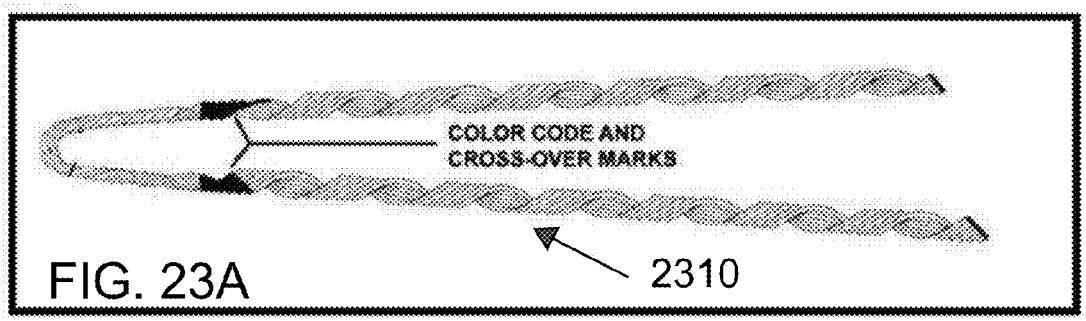
FIGS. 23A-23C illustrate embodiments of FRP connectors.
Figure 23B:
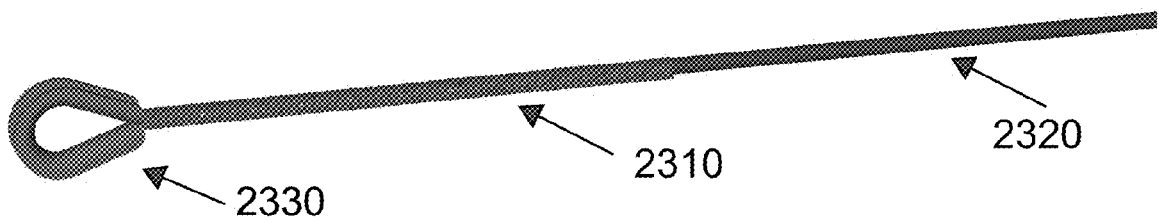
Figure 23C:
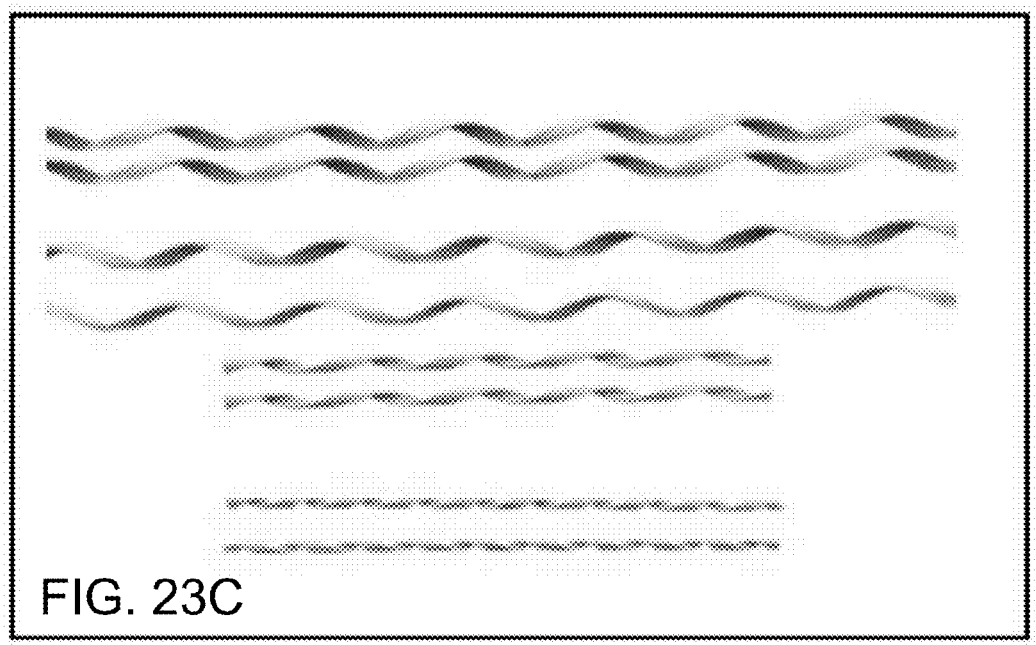

FIG. 23A illustrates one embodiment of an FRP terminating connection. The dead-end or big-grip 2310 connection are preformed wires that twist onto the FRP rebar 2320. FIG. 23B illustrates one embodiment of a dead-end connector. The dead-end connector is an industry-standard connection device used in the utility pole and guy tower industry for terminating guy wires. The dead end is often made of hot-dipped galvanized steel and used with an accompanying thimble 2330. FIG. 23C illustrate embodiments of preform wires, which are another form of FRP or steel rebar couplings for joining rebar ends together. In one embodiment, these connectors are made of galvanized steel and are common connectors for steel cables when placing a down-guy for supporting a power pole in the electrical utility industry. In one embodiment, the dead end is also equipped with an end clip for crimping the ends of the wires around the cable or rod.

The Floating Solar System described, solves numerous problems within the "floating solar" industry. Floating Solar is an emerging technology and is installed in throughout the same markets that install ground mount solar systems. Instead of using plastic for structural strength, the Floating Solar System uses in one embodiment Fiber Reinforced Polymer, Fiber Reinforced Plastic, or FRP or steel cable or metal tubing. Instead of a 20-year possible design life, the Floating Solar System has a 40-year design life due to the materials used. In one embodiment the materials include plastic, FRP, and stainless steel or galvanized steel. In one embodiment, the plastic is UV resistant, and is designed to be exposed to little or no sunlight, the FRP grid absorbs all structural wind and wave forces), and also increases the usable life of the Floating Solar System. In one embodiment the plastic is HDPE (high-density polyethylene.) In one embodiment, the floating solar system described has no metal components other than metal fasteners. These fasteners are either made of stainless steel or galvanized steel, in one embodiment. As such, the floating solar system can be deployed in a salt water environment, because all the racking components described are salt water compatible.

Advantages of Some Embodiments of the Present Design

The Floating Solar System described provides numerous advantages, and solves problems with existing systems in one embodiment. Some of the features that may be part of the Floating Solar System, and the associated advantages, are listed below. The system in one embodiment includes blow-molded high density polyethylene (HDPE) floats. In one embodiment, a. Blow-molded forming is structurally sound, inexpensive to manufacture and floats can be produced at a fast rate.
b. Floats are made of recycled plastic and can use up to 100% recycled plastic. Systems that rely on their floats for structural support will increase their risk if the use any recycled plastic.
c. Floats have indentations for accepting the HDPE frame that encapsulates the float and FRP rebar mat grid.
d. Float footprint can be smaller than PV panel. Float hides under canopy of PV—preventing UV degradation; no direct sunlight shines on plastic solar panel floats. Less refracted sunlight shines on float.
e. Maximum convection of air flow throughout racking system, increasing panel cooling and PV efficiency over prior art due to higher tilt angle and increased spacing between panel and float.
f. Sheds algae, floating plant life, etc.
g. Will release from mud or reservoir bottom if floats are ever "beached"
h. HDPE large diameter irrigation pipe or is a cost-effective method for elevating the grid platform in an offshore sea environment. HDPE irrigation pipes can be welded, have ample wall thickness and are impervious to UV and salt water. These pipes have sufficient buoyancy to support solar panels.
i. In one embodiment, Floats are equipped with inlet water ports for providing ballast and preventing uplift to the racking system under high wind conditions.
j. Floats are made with "state of the art" UV stabilizers, in one embodiment.
k. The Floating Solar System grid system provides a means of attachment for walkways.
l. Metal, plastic or wooden planks are directly attached to the FRP grid for walking access, in one embodiment.
m. These planks have attachment clips that secure the walkway plank to the FRP grid.
n. Planks may span over couplings and add dampening to the grids' movements.
o. A cart or wheeled vehicle may be guided and/or pulled by a cable and motor system over the FRP rebar rails. For example, a small motorized winch attached to a cart may clip on to a small cable that runs parallel and in between the rows. This would allow the cart and rider to navigate the "isle" spacing in between panels assisted and directed by a motor and cable-guide assist.
p. Walkways are placed between solar panel rows as an "as needed basis" when maintenance is required, in one embodiment. This reduces the weight of the complete system, since only the portion of the Floating Solar System currently being accessed has the walkways. These walkway planks can then be removed and placed somewhere else, when not in use. In one embodiment, Walkway planks are only a permanent fixture along the North-South walkways. These are typically placed at the beginning and ending of a solar module string connected in series.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The invention claimed is:

1. A floating solar system comprising:
a grid comprising:
a plurality of rod-cables, at least some of the rod-cables comprising one or both of fiber reinforced polymer rods and fiber reinforced polymer rebar, and
a plurality of couplers to rigidly couple the plurality of rod-cables, to form the grid, wherein the fiber reinforced polymer creates a flexible grid, the grid providing a support structure;
a plurality of solar floats to provide buoyancy, each solar float coupled to the grid, the plurality of solar floats not providing structural support; and
a plurality of frames attached to the plurality of solar floats, the frames designed to support solar panels, wherein each solar panel is designed to provide shade for a corresponding solar float.

2. The floating solar system of claim 1, wherein:
the plurality of rod-cables comprise:
a first plurality of substantially parallel fiber reinforced polymer (FRP) rods extending in a first direction; and
a second plurality of substantially parallel FRP rods extending in a second direction, perpendicular to the first direction; and
the plurality of couplers comprise cable clamps at intersections of the FRP rods in the first direction and the FRP rods in the second direction.

3. The floating solar system of claim 2, further comprising:
a removable walkway designed to be supported by the grid and the clamps, the removable walkway configured to be placed temporarily to service the floating solar system, and removed when not needed.

4. The floating solar system of claim 1, further comprising:
each solar float including:
a plastic body having a top and a bottom;
a first set of grooves in the top of the solar float into which rod-cables of the grid are fitted;
a second set of grooves in the bottom of the solar float into which the frames for the solar panel fit; and
clamps to attach the frames to the grid.

5. The floating solar system of claim 1, further comprising:
each solar float comprising an azimuth tracking solar float comprising:
an outside frame to provide buoyancy, the outside frame coupled to the grid at a plurality of points;
a central float, rotatably positioned within the outside frame, such that the central float supports the solar panel, and is configured to be rotated to follow sun beams.

6. The floating solar system of claim 5, wherein the outside frame comprises an outside float.

7. The floating solar system of claim 6, wherein the central float and the outside frame are made from materials that have a low coefficient of friction with each other, to provide bearing surfaces.

8. The floating solar system of claim 1, further comprising:
the plurality of solar panels comprising bifacial solar panels; and
an albedo plane of white material affixed to the grid to reflect light to the bifacial solar panels.

9. The floating solar system of claim 1, further comprising:
reinforcing cables for the grid, the reinforcing cables comprising steel cables in parallel with a subset of the rod-cables.

10. The floating solar system of claim 1, further comprising:
a plurality of elevating floats, coupled to the grid;
the plurality of frames to support a plurality of solar panels, each frame coupled to an elevating float; and
a plurality of solar panels supported by two frames on the elevating float and the plurality of solar floats, such that the plurality of solar panels have a low elevation.

11. The floating solar system of claim 10, wherein the elevating float comprises a capped irrigation pipe.

12. The floating solar system of claim 10, further comprising:
an arrangement alternating an elevating float and a solar float, such that a solar panel extends between the frames on the elevating float and the frames on the solar floats.

13. The floating solar system of claim 10, further comprising:
the plurality of solar floats and a walkway float suspended above a water level by the elevating float.

14. The floating solar system of claim 10, further comprising:
when the elevating float is an irrigation pipe, a smaller diameter pipe filled with water in the elevating float extending along the irrigation pipe to provide a stable ballast.

15. The floating solar system of claim 1, further comprising:
module clamps at ends of the frames, to receive the solar panels, wherein tightening the module clamps to the solar panels also constricts the clamps to the frames, and each module clamp utilizes a single bolt to clamp the module clamps and constrict the frames.

16. A floating solar system comprising:
a first plurality of rod-cables in a first direction, at least some of the rod-cables comprising one or both of fiber reinforced polymer rods and fiber reinforced polymer rebar;
a second plurality of rod-cables in a second direction, perpendicular to the first direction;
the first plurality of rod-cables rigidly coupled to the second plurality of rod-cables at a plurality of intersection-points, forming a regular grid, wherein the grid does not include any hinged elements, and the rod-cables provide flexibility;
a plurality of solar floats to provide buoyancy, each solar float coupled to two parallel rod-cables of the grid, the plurality of solar floats not providing structural support; and
a plurality of frames designed to support a plurality of solar panels, two frames coupled to each solar float to support a solar panel, each solar panel providing shade for a corresponding solar float.

17. The floating solar system of claim 16, wherein the rod-cables comprise one or more of: fiber reinforced polymer rods, fiber reinforced polymer rebar, and/or steel cable.

18. The floating solar system of claim 16, wherein the rod-cables are coupled to each other using a clamp comprising two disks, each disk having a groove into which a rod-cable is fit, and a U-bolt coupling the two disks.

19. The floating solar system of claim 16, wherein the rod-cables are threaded, and the threading enables secure attachment of rod-cables to each other.

20. A floating solar system comprising:
an array segment comprising:
- a first plurality of rod-cables in a first direction, at least some of the first plurality of rod-cables comprising fiber reinforced polymer rods or fiber reinforced polymer rebar;
- a second plurality of rod-cables in a second direction, perpendicular to the first direction, at least some of the second plurality of rod-cables comprising fiber reinforced polymer rods or fiber reinforced polymer rebar; and
- a plurality of non-hinged couplers coupling the first plurality of rod-cables to the second plurality of rod-cables at a plurality of intersection-points, the first plurality of rod-cables and the second plurality of rod-cables forming a regular grid;

wherein the floating solar system comprises one or more array segments, and the array segments are coupled via hinged elements;
a plurality of solar floats to provide buoyancy, each solar float coupled to two parallel rod-cables of the grid, the plurality of solar floats not providing structural support, each solar float having a groove into which the rod-cables are fitted; and
frames designed to support solar panels coupled to one or more of the plurality of solar floats.

21. The floating solar system of claim 20, further comprising:
solar module clamps at ends of the frames, the solar module clamps using a single bolt to clamp the solar panels and the frames, the frames fitting into grooves in the solar floats, and clamped to the rod-cables of the solar floats.

22. The floating solar system of claim 1, further comprising:
a first rod-cable in a first direction, the first rod-cable comprising two or more rebar lengths coupled together end-to-end using cable clamps that apply clamping force to the rebar lengths.

* * * * *